(12) United States Patent
Tanjou et al.

(10) Patent No.: US 7,504,179 B2
(45) Date of Patent: Mar. 17, 2009

(54) SECONDARY CELL MODULE AND METHOD OF ITS PRODUCTION

(75) Inventors: Yuuji Tanjou, Yokohama (JP); Hideaki Horie, Yokosuka (JP); Kyouichi Watanabe, Yokosuka (JP); Takanori Ito, Zushi (JP); Osamu Shimamura, Yokosuka (JP); Hironori Ozawa, Tokyo (JP); Takao Takasaki, Tokyo (JP); Kazunori Ozawa, Tokyo (JP)

(73) Assignees: Nissan Motor Co., Ltd., Yokohama-shi (JP); Enax, Inc., Tokyo (JP)

( * ) Notice: Subject to any disclaimer, the term of this patent is extended or adjusted under 35 U.S.C. 154(b) by 304 days.

(21) Appl. No.: 10/431,501

(22) Filed: May 8, 2003

(65) Prior Publication Data

US 2003/0215702 A1 Nov. 20, 2003

(30) Foreign Application Priority Data

| May 8, 2002 | (JP) | ............................ 2002-132844 |
| May 21, 2002 | (JP) | ............................ 2002-146112 |
| May 21, 2002 | (JP) | ............................ 2002-146113 |
| Sep. 13, 2002 | (JP) | ............................ 2002-268712 |
| Nov. 25, 2002 | (JP) | ............................ 2002-341220 |

(51) Int. Cl.
*H01M 6/12* (2006.01)
*H01M 2/02* (2006.01)

(52) U.S. Cl. ........................ 429/162; 429/160; 429/179; 429/185; 429/127

(58) Field of Classification Search .................. 429/96, 429/99, 158, 160, 162, 127, 7, 211, 9, 185; 439/500
See application file for complete search history.

(56) References Cited

U.S. PATENT DOCUMENTS

| 5,871,861 | A | 2/1999 | Hirokou et al. | |
| 6,461,757 | B1 | 10/2002 | Sasayama et al. | |
| 2002/0022178 | A1* | 2/2002 | Asaka et al. | 429/158 |
| 2003/0134190 | A1* | 7/2003 | Ishida et al. | 429/162 |
| 2003/0170535 | A1* | 9/2003 | Watanabe et al. | 429/158 |
| 2005/0100785 | A1* | 5/2005 | Enomoto et al. | 429/174 |

FOREIGN PATENT DOCUMENTS

| EP | 0 973 212 A1 | 1/2000 |
| EP | 1 339 114 A1 | 8/2003 |
| JP | 01-241748 A | 9/1989 |
| JP | 02-052260 U | 4/1990 |
| JP | 02-065868 U | 5/1990 |
| JP | 03-127445 A | 5/1991 |
| JP | 06-124696 | * 5/1994 |
| JP | 07-262981 | * 10/1995 |
| JP | 7-282841 A | 10/1995 |
| JP | 8-96837 A | 4/1996 |
| JP | 8-96841 A | 4/1996 |
| JP | 10-188942 A | 7/1998 |
| JP | 11-162443 A | 6/1999 |
| JP | 11-273643 A | 10/1999 |
| JP | 2001-143769 A | 5/2001 |
| JP | 2002-8605 A | 1/2002 |
| JP | 2002-050329 A | 2/2002 |
| JP | 2002-050334 A | 2/2002 |
| JP | 2002-110122 A | 4/2002 |
| JP | 2002-208385 A | 7/2002 |
| JP | 2002-216722 A | 8/2002 |
| JP | 05-006687 U | 1/2007 |
| WO | WO98/42036 A1 | 9/1998 |
| WO | WO 01/57941 A1 | 8/2001 |
| WO | WO-02/054525 A1 | 7/2002 |

OTHER PUBLICATIONS

English language abstract of JP 11-162443 (Jun. 18, 1999).
English language abstract of JP 09-134731 (May 20, 1997).
English language abstract of JP 2001-256937 (Sep. 21, 2001).
English language abstract of JP 2002-117828 (Apr. 19, 2002).
English language abstract of JP 2002-042884 (Feb. 08, 2002).
English language abstract of JP 09-274935 (Oct. 21, 1997).
English language abstract of JP 07-142069 (Jun. 02, 1995).
English language abstract of JP 2000-182581 (Jun. 30, 2000).
English language abstract of JP 2001-307784 (Nov. 02, 2001).
English language abstract of JP 2004-087438 (Mar. 18, 2004).
English language abstract of JP 2001-256938 (Sep. 21, 2001).
English language abstract of JP 2002-124221(Apr. 26, 2002).
English language abstract of JP 2002-141052 (May 17, 2002).
English language abstract of JP 2002-252036 (Sep. 06, 2002).
English language abstract of JP 2004-031162 (Jan. 20, 2004).

* cited by examiner

*Primary Examiner*—Raymond Alejandro
(74) *Attorney, Agent, or Firm*—Birch, Stewart, Kolasch & Birch, LLP

(57) ABSTRACT

A secondary cell module and the method of its production, which comprises a combination cell formed by connecting the positive and/or the negative electrode terminal(s) of multiple secondary cells in series and/or in parallel with each other through a metal bus-bar and a casing which contains the combination cell, wherein the secondary cell is formed in a sheet shape and comprises sheet-type internal electrode couple, electrolytic solution and a flexible outer wrapper of envelope type which contains them in a sealed state. The secondary cell module is of a simple structure and it can be small-sized and light-weighted or thin-shaped as necessary and the heat which generates inside the cell can be efficiently diffused to outside, thereby enabling the production of cells of high capacity with a high degree of freedom in designing its shape as well as supreme productivity.

17 Claims, 32 Drawing Sheets

(a)

(b)

SECONDARY CELL MODULE AND METHOD OF ITS PRODUCTION

BACKGROUND OF THE INVENTION

1. Field of the Invention

This invention refers to a secondary cell module and the method of its production and, although not specially limited to these, relates to a high capacity secondary cell module and the method of its production which is the most appropriately used for uses in electric automobiles, UPS (uninterruptible power equipment), load leveling of electricity, etc.

2. Related Art Statement

In recent years, electric automobiles are attracting attention for reason of environmental problems, etc. and there is an increasing need for a high capacity and low cost secondary cell of maintenance-free for the purpose of securing electricity at time of disaster such as earthquakes, etc. and an efficient use, etc. of electricity at night.

In this connection, also in the past, for example, a secondary cell module of high capacity in which multiple lithium ion secondary cells (electric cell) are connected in series with each other in order to form a combination cell and this combination cell incorporated into a casing has been proposed (each official report of JP H07-282, 841 A, JP H08-96, 987 A and JP H08-96, 841 A). And in these secondary cell modules, the contour of each lithium ion secondary cell (electric cell) which forms its combination cell is formed in block type by laminating, using separators in between, its positive electrode on metal material on which an active material compound is applied and its negative electrode of metal material on which an active material compound is applied, more than 2 of these electric cells are connected in series, and each electric cell of a combination cell contained in a container body (casing) is divided by partition walls installed in the container body, thereby each electric cell being insulated from each other, both of these being considered appropriate for securing a high capacity cell.

In this type of secondary cell module, however, the problem is that the cell cannot but be a block shape of a comparatively large contour because the container body must contain multiple electric cells of block shape, which limits the degree of freedom in designing the shape of the container body as well as the container becoming inevitably large because of need of partition walls for insulating each electric cell which forms a combination cell, thus increasing its weight by that degree.

And this type of problem of a secondary cell module may become a fatal problem in case it is used in an electric automobile. That is, in an electric automobile, the set-up space for installing a secondary cell module is quite limited, it becomes necessary to make a big change in the relative set-up positions of other parts in case the secondary cell module becomes too large, and also there is a problem that the fuel cost efficiency of an automobile drops if the weight of the secondary cell module increases, all of which require a cell of small size and light weight in addition to a high degree of freedom in designing its shape.

In this connection, for example, when a secondary cell of lithium ion is used in an electric automobile, a high capacity is required in view of a safe and stable running as well as securing a long running distance by one electrification, and in order to achieve this at a high level, a cell of a higher capacity is desired. In uses where this kind of high capacity is desirable, although not limited to automobiles, a large electric current discharge sometimes occurs when a secondary cell of lithium ion is in use, in which case a large amount of heat which is in proportionate to (electric current)×(internal resistance) generates and this heat diffuses by a large amount from the surface of an electrode in the direction of normal line.

Therefore, in case a secondary cell module of a high capacity if formed by composing a combination cell by connecting, specifically, multiple secondary cells of lithium ion with each other and by incorporating this combination cell into a casing, the larger the number of electric cells to be connected becomes and the higher its capacity becomes, the more important the problem becomes of how easily to diffuse the heat generated in each electric cell so that it does not accumulate, and this problem cannot be coped with only by shaping the cell in a sheet type with the area of its plane surface being made larger against the its thickness or by utilizing each terminal which is drawn outside from the internal electrode couple in order to radiate the heat.

SUMMARY OF THE INVENTION

Hence, as a result of making profound studies on a secondary cell module of a simple structure which can be made small-sized and light-weighted as well as thin-shaped as necessary, in which module the heat generated inside the cell can be effectively diffused into outside, thereby making it easy to secure a high capacity cell and a high degree of freedom in designing its shape as well as ensuring supreme productivity, the inventors have found it possible to solve the above-mentioned problem and completed this invention by forming an electric cell using multiple secondary cells of sheet type composed of sheet-type internal electrode couple, electrolytic solution and a flexible outer wrapper of envelope type which contains these internal electrode couple, electrolytic solution in a sealed state, by forming a combination cell by incorporating these multiple cells in series and/or in parallel with each other using metal bus-bars and, by incorporating this combination cell into a casing.

The inventors have also found that, by connecting at least either one of the terminals of positive electrode terminal or negative electrode terminal of each secondary cell other than, at least, those secondary cells at both ends and connected to external leads, to the terminal of other secondary cell through a prescribed bus-bar, it is possible to effectively diffuse the heat generated inside each secondary cell by utilizing this bus-bar, when a combination cell is formed with multiple secondary cells of sheet type and incorporated into a casing.

The inventors have further found that, by bending the terminal connection part, which is formed by directly connecting the terminal of each secondary cell, and/or the bus-bar connection part, which is formed by connecting the terminal of each secondary cell through a bus-bar, and placing it on the outer surface of the outer wrapper of envelope type of the secondary cell, the combination cell can be formed more in compact as well as the idle space which occurs when this combination cell is incorporated into the casing being able to be more efficiently eliminated, when a combination cell is formed with multiple secondary cells of sheet type and incorporated into a casing.

The inventors have also further found that, by placing the positive electrode terminal of one secondary cell and the negative electrode terminal of the other secondary cell so that they face each other in a pair of secondary cells which are laminated vertically and form a laminated cell couple, it is possible to place all the secondary cells forming a combination cell under a roughly equal thermal environment, thereby making the heat generated from the combination cell almost even as a whole in addition to the combination cell being made thin-shaped as a whole and the thermal diffusion being made efficiently, when a combination cell is formed with multiple secondary cells of sheet type and incorporated into a casing.

In addition, by fixing the interval of secondary cells which are positioned adjacent to each either vertically and/or horizontally by using means of adhesion, it is possible to make the cell thin-shaped and efficiently diffuse the heat generated inside the cell as well as being able to produce a secondary cell module with good productivity and a simple structure which can be made small-sized and light-weighted, when a combination cell is composed of multiple secondary cells of sheet type and incorporated into a casing.

Therefore, the purpose of this invention is to provide a secondary cell module of a simple structure which can be made small-sized and light-weighted as well as thin-shaped as necessary, in which module the heat generated inside the cell can be efficiently diffused into outside, thereby making it easy to secure a high capacity cell and a high degree of freedom in designing its shape as well as ensuring supreme productivity.

Another purpose of this invention is to provide the method of production of a secondary cell module by which a high capacity secondary cell module can be produced with good productivity.

In other words, this invention is composed of a combination cell which is formed by connecting the positive electrode terminal and/or negative electrode terminal of multiple secondary cells in series and/or in parallel with each other by using metal bus-bars and a casing which contains this combination cell, and the secondary cell module in this invention is characterized by the above sheet-type secondary cell which composed of sheet-type internal electrode couple, electrolytic solution and a flexible outer wrapper of envelope type which contains these internal electrode couple and electrolytic solution in a sealed state.

This invention also relates to the method of production of a secondary cell module characterized by that each secondary cells which is vertically and/or horizontally adjacent to each other are fixed by an adhesion in order to fix the relative position of each secondary cell and then a combination cell is formed by connecting these multiple secondary cells in series and/or in parallel with each other, when a combination cell is formed by connecting, in series and/or in parallel with each other, multiple secondary cells which are formed in sheet type by sheet-type internal electrode couple, electrolytic solution and a flexible outer wrapper of envelope type which contains these internal electrode couple and electrolytic solution in a sealed state and incorporated into a casing.

The secondary cell of sheet type in this invention is formed by sheet-type internal electrode couple where the sheet-type positive electrode composed of a sheet-type current collector on which surface a positive electrode active material is applied and the sheet-type negative electrode current collector on which surface a negative electrode active material is applied are laminated with a separator in between. Also, the flexible outer wrapper of envelope type which contains this sheet type internal electrode couple and electrolytic solution in a sealed state at least has an excellent electrolytic solution resistance as against the electrolytic solution contained as well as a strength which can be usable for an electric cell case of a sheet-type secondary cell, more concretely, an example of a flexible outer wrapper of envelope type (Refer to Table No. 98/042,036) can be shown, which is formed by using a laminated film of three layer structure with the inner surface having an inner layer made of a thermoplastic resin with an excellent electrolytic solution resistance and a heat sealing capacity such as, as an example, polyethylene, polypropylene, polyethylene terephthalate (PET), polyamide, ionomer, etc., the middle part having a middle layer made of a metal foil with an excellent flexibility and strength such as, as an example, aluminum foil, SUS foil, etc. and the outer surface having a outer layer made of an insulating resin with an excellent electric insulation such as, as an example, polyamide resin, polyester resin, etc.

The positive electrode terminal and the negative electrode terminal in the above-mentioned secondary terminal of sheet type are connected to each other to form a connection part (terminal connection part) or form a connection part through a metal bus-bar (bus-bar connection part), and, with regard to the means of adhesion to when forming these terminal connection part or bus-bar connection part, welding methods such as, for example, ultrasonic welding, laser welding, tungsten inert gas (TI) welding, resistance welding, etc. are preferable, ultrasonic welding being more preferable in view of earthquake resistance and workability as well as a combined use of ultrasonic welding and rivets.

In order to form a combination cell by connecting many secondary cells efficiently in series and/or in parallel with each other in this secondary cell of sheet type, it is preferable that the positive electrode terminal and the negative electrode terminal are formed in a plate shape, and, although these positive electrode terminal and positive electrode terminal of the secondary cell may be placed at any place of the outer wrapper of envelope type, it is also preferable that these positive electrode terminal and negative electrode terminal are placed so that they extend in the direction opposite to each other from the outer wrapper of envelope type in order to form a combination cell by efficiently connecting many secondary cells in series with each other, each secondary cell which forms a combination cell being more preferably shaped in roughly the same size and shape.

When forming the positive electrode terminal and negative electrode terminal of the above-mentioned sheet-type secondary cell in plate shape, those terminals with comparatively small thickness of about 50 to 200 μm made of aluminum plate, copper plate, nickel plate, etc., are preferable and band type bus-bars with thickness of 0.4 to 2.0 mm and cross-sectional area of more than 8 $mm^2$ made of copper plate, aluminum plate, etc. are preferable, thereby making it possible, when connecting secondary cells in series and/or in parallel with each other, to easily and securely connect each terminal or the terminal and the bus-bar by using convenient means of adhesion such as ultrasonic welding, rivets, etc., in addition to making it possible to effectively diffuse the heat which generates at time of charging of the secondary cell.

With regard to the material of the bus-bar to be used when forming a combination cell, it is preferable that it is formed by a material with a higher thermal conductivity than that of the material of the positive electrode terminal and the negative electrode material of the secondary cell to be connected to said bus-bar in order to effectively lead the heat generated inside the secondary cell into outside, and, with regard to the cross-sectional area of each bus-bar, it is preferable that it be more than 0.5 times of the total of the cross-sectional area (total cross sectional area) of the positive electrode terminal and/or the negative electrode terminal of the secondary cell to be connected to said bus-bar, more preferably more than 0.8 times and 3.0 times or under. If it is less than 0.5 times, a problem of heat deterioration occurs and a problem of mechanical damage of electrode terminals occurs if it exceeds 3.0 times.

Also, when the connection part between each of the above-mentioned bus-bar and the positive electrode terminal and/or the positive electrode terminal connected to said bus-bar is connected by means of ultrasonic welding and/or rivets, it is preferable that the following formula is met with regard to the relationship between the total of the joint area (total joint area W cm$^2$) of the joint sections formed by the ultrasonic welding and/or rivets at each of these connection parts and the average discharge current (IA) from the secondary cell connected to said bus-bar:

$$W/I \geq 0.1 \quad (1)$$

Since there are cases where a large electric current discharge occurs in cases of use in, for example, electric automobiles, it is necessary to secure a fairly large total joint area in the above-mentioned connection part and it is preferable that the above formula (1) be met, and it is possible to easily secure this total joint area by forming joint sections using ultrasonic welding. Also, although there is no specific upper limit in the total joint area W (cm$^2$) in the connection part, it is useless if it is too large which will reduce the space efficiency and it is preferably be under 90% of the area of the bus-bar.

Herein, the term connection part between each bus-bar and each of the positive electrode terminal and/or the negative electrode terminal which are connected to the said bus-bar is used to generally show the area where each bus-bar and each terminal are to be connected with each other, and the term joint section formed by ultrasonic welding and/or rivets means such a section in this connection part as is welded by ultrasonic welding to form a combined section with each other, or a section in this connection part which is firmly in touch with each other by means of rivets and always physically in touch with each other without being separated, through which electricity flows stably.

With regard to the joint sections formed in this connection part, it is preferable to perform welding for connection on multiple separate joint sections in order to secure strength of connection, both in the cases of ultrasonic welding and rivets, and especially in the case of ultrasonic welding, it is preferable to perform welding for connection on multiple separate joint sections. This is because a high power is required in the case of welding of a large area at one time by ultrasonic welding and a large load is partially imposed on comparatively thin sections of the terminal with a possibility of cracks in some cases. By connecting multiple separate joint sections, it is possible to largely reduce the load imposed on each joint section.

When forming multiple joint sections in a connection part by ultrasonic welding as mentioned above, it is preferable to secure a distance of more than 0.5 mm, preferably more than 1 mm, between each joint sections adjacent to each other. Also, in order to avoid any adverse effect on the bonding strength of the active material applied on the electrode connected to each terminal, it is preferable that each joint section is separated by more than 7 mm, preferably more than 10 mm, from the section of the electrode on which active material is applied.

In a combined cell composed of the above-mentioned secondary cell of sheet-type, the interval of each terminal of a pair of secondary cells which are connected in series and/or in parallel with each other forms a directly connected terminal connection part and/or bus-bar connection part connected through a bus-bar. These terminal connection part and/or bus-bar connection part are preferably bent and placed on the outer surface of the outer wrapper of envelope type of the secondary cell.

Here, the above-mentioned terminal connection part may either be bent and placed on the outer surface of either one of the pair secondary cells connected to each other, or be placed on the outer surface in between the pair secondary cells connected with each other. Also, the above-mentioned bus-bar connection part may either be bent so that the bus-bar is positioned on the outside, or be bent so that the bus-bar is positioned inside. Further, the above-mentioned terminal connection part and/or bus-bar connection part is preferably bent so that it faces the sealed part of the outer wrapper of envelope type of the secondary cell and, more preferably, be placed so that the height of its outer surface is almost even with the height of the outer surface of the secondary cell.

In this invention, it is preferable to install an insulation spacer made of synthetic resin with electric insulation in between the above-mentioned terminal connection part and/or bus-bar connection part and the outer surface of the secondary cell, thus ensuring the insulation between the secondary cells. With regard to the shape of this insulation spacer, it may either be shaped as a plain board type or it may straddle the terminal connection part and/or the bus-bar connection part with its cross-sectional view straddling the connection parts and covering both sides of their surfaces, as far as it is surely installed in between the terminal connection part and/or bus-bar connection part and the outer surface of the outer wrapper of envelope type, thereby ensuring the insulation between the secondary cells. With regard to the material of the insulation spacer, there is no specific limitation if it is non-conductive and has insulation capacity. Like the outer wrapper of envelope type of the secondary cell as mentioned above, it should preferably have a proper strength, electrolytic solution resistance and thermal resistance as well as flexibility. Concrete examples are polyethylene, polypropylene, PET, paper, rubber, etc. By installing the insulation spacer in this manner, it is possible to surely avoid the terminal connection part and/or bus-bar connection part which is bent and placed on the outer surface of the outer wrapper of envelope type or which is sometimes placed in firm contact to the surface, from erroneously injuring or damaging the outer wrapper of envelope type.

In the secondary cell module of this invention, preferably, except for the terminals which are connected to outside leads for drawing the electricity outside from the casing, the positive electrode terminal or the negative electrode terminal of one secondary cell as mentioned above is connected to the positive electrode terminal or the negative electrode terminal of the other secondary cell forming a cell laminated couple by being vertically laminated with each other, and the negative electrode terminal or the positive electrode terminal of the other side is connected to the negative electrode terminal or the positive electrode terminal of the other secondary cell forming a cell adjacent couple by being positioned horizontally with each other. In a pair of secondary cells forming cell laminated couple, the positive electrode terminal of one secondary cell is directly connected to the negative electrode cell of the other secondary cell, thus forming a terminal connection part, and in a pair of secondary cells forming cell adjacent couple, the positive electrode terminal of one secondary cell is connected to the negative electrode terminal of the other secondary cell through a bus-bar of band type, thus forming a bus-bar connection part.

By forming a cell laminated couple by vertically laminating the cells with each other and/or cell adjacent couple by horizontally positioning the cells, thus by positioning each secondary cell so that its thermal environments are generally the same with each other, as mentioned above, it is possible to maintain a thermal balance in the cell laminated couple as a whole, although in each secondary cell the temperature rises (heat radiation) on the side of insertion (dope) and the temperature drops (heat sink) on the side of separation (dedope)

at time of electric charging and discharging, thus avoiding areas of partially high temperature at time of charging and discharging of a combination cell contained in the casing, which further makes it possible to maintain all the secondary cells forming a combination cell at a low temperature as well as more efficiently diffuse the heat in the combination cell by using, at the same time, means of heat radiation such as filling of resin, etc.

With regard to each secondary cell as mentioned above in this invention, by laminating one or more than two secondary cells so that the same electrode terminals face each other and by forming cell units by connecting these terminals in parallel, a combination cell may be formed by using these unit cells. By forming cell units in which multiple secondary cells are connected in parallel with each other and by forming a combination cell by using these unit cells, as mentioned above, it is possible to maintain efficient heat radiation and to assemble a secondary cell module of a higher capacity.

The combination cell formed as mentioned above normally has a shape of a cube with its contour of thin wall thickness (thin cube) and the combination cell with this shape of thin cube is used as a base. For example, in case a lithium ion secondary cell of a high capacity is required, multiple combination cells may be positioned horizontally to each other and are connected in series with each other, or multiple combination cells may be treated as a unit (combination cell unit), where these combination cell units are laminated vertically and/or positioned horizontally so that the thermal environments of all combination cell units are the same, to form a larger combination cell. In order to secure thin shape and uniform heat radiation of the secondary cell, this combination preferably meet the formula of $A/t=400$ cm, where the largest surface (normally plane surface) area is $A$ cm$^2$ and the thickness is $t$ cm.

In this invention, there is no specific limitation as to the number of the sheet-type secondary cells used to form a combination cell or the number of cell laminated couples to be formed, which are to be chosen case by case depending on the conditions for designing the secondary cell module, such as the capacity (Ah), energy (Wh), power (W), etc. of the secondary cell to be used, the required capacity, allowable size and weight, etc. of the secondary cell module to be manufactured as well as the position as to where on the casing the outside lead which draw out the electricity from the casing of the secondary cell module manufactured is to be positioned, etc. Therefore, in case, for example, the number of sheet-type cell module to be used is an odd number, one of the total secondary cells is used without forming a cell laminated couple.

Furthermore, with regard to each secondary cell adjacently positioned horizontally to each other and forming cell adjacent couples, it is preferably be overlapped with the sealed part of the outer wrapper of envelope type in order to form a compact combination cell.

When a combination cell is formed by forming terminal connection part and/or bus-bar connection part in the above-mentioned multiple secondary cells, it is preferable to fix, in advance, the interval between each secondary cell vertically and/or horizontally connected to each other so that their relative position will not be distorted, preferably by using, as an example, adhesives of rubber, acrylic, epoxy, etc., double-faced adhesive tape, single face adhesive tape, etc., or more preferably by using double faced-adhesive tape. By this, the combination cell forming process, in which the terminal connection part and/or bus-bar connection part is formed between each secondary cell and a combination cell is formed, can be made extremely easy, and also the handling of combination cells becomes easy in the combination cell incorporation process to incorporate the combination cell composed of many secondary cells and in the resin filling process to fill loading material of resin into the casing with combination cells incorporated inside, thereby improving the productivity of the secondary cell module to a great extent. Furthermore, by fixing the interval between each secondary cell by means of adhesives, the adhesion of the interval of each secondary cell is maintained and the heat is easily transmitted between these secondary cells, thus the heat generated from the combination cell becoming uniform as a whole and the heat being effectively diffused With regard to the casing to contain the above-mentioned combination cell in this invention, although its shape is basically determined based on the shape of contour of the combination cell formed as mentioned above, the outer shape of this casing is preferably a thin cube determined in line with the shape of the combination cell in consideration of the diffusion of heat which generates at time of charging and discharging of the secondary cell module, and more preferably, $A/t=50$ cm is met, where the area of the largest surface (normally a plane surface) is $A$ cm$^2$ and the thickness is $t$ cm$^2$. The outer shape of the casing may not be limited to this kind of thin cube, but its whole outer shape may be hyperbolic or may be slightly curved to become sigmoid within the range as permitted by the combination cell composed of sheet-type secondary cells. Furthermore, desired variations of the whole outer shape may be allowed by considering the positioning of the secondary cell forming a combination cell.

Also, with regard to the material of this casing, there is no specific limitation as far as it can display such strength as is able to maintain a prescribed shape, and aluminum, copper, brass, iron, stainless, etc. may be used, as an example. It is preferable that the secondary cell module after the final assembly is as light as possible, and it is also preferable that the material has an excellent thermal conductivity because the heat generated at time of charging the combination cell contained inside the casing must be diffused into outside. Aluminum alloy, etc. can be a more concrete example.

More preferably, in this invention, it is preferable to fix the combination cell which is contained inside the casing by filling a loading material of resin with electric insulation into the casing, and it is also preferable to ensure the insulation between the secondary cells forming the combination cell. By ensuring to fix the combination cell and by ensuring the insulation between each secondary cell by filling a loading material of resin into the casing as mentioned above, it is possible to prevent, beforehand, the generation of heat, smoke, fire, etc. due to the short-circuit of the secondary cell forming a combination cell inside the casing which occurs by mistake, even when the vibration at time of running or the shock at time of collision acts when the casing is installed in electric automobiles, as an example.

With regard to the loading material of resin used in this invention, although there is no specific limitation if it can provide electric insulation, it should preferably have thermal conductivity in view of diffusing the heat generating at time of charging as much as possible. Also, in order to ensure the absorption of shock, it should more preferably has viscoelasticity.

Examples of the loading material of resin in this invention are polyethylene (PE), polypropylene (PP), polyethylene terephthalate (PET), polycarbonate (PC), polyimide, polyamide-imide, ABS resin, acrylic resin, epoxy resin, silicone resin, polyurethane resin, etc.

DETAILED DESCRIPTION OF THE PREFERRED EMBODIMENT

This invention is explained under the following lines in concrete terms based on the embodiments and test models.

[Embodiment 1]

Figure 3:
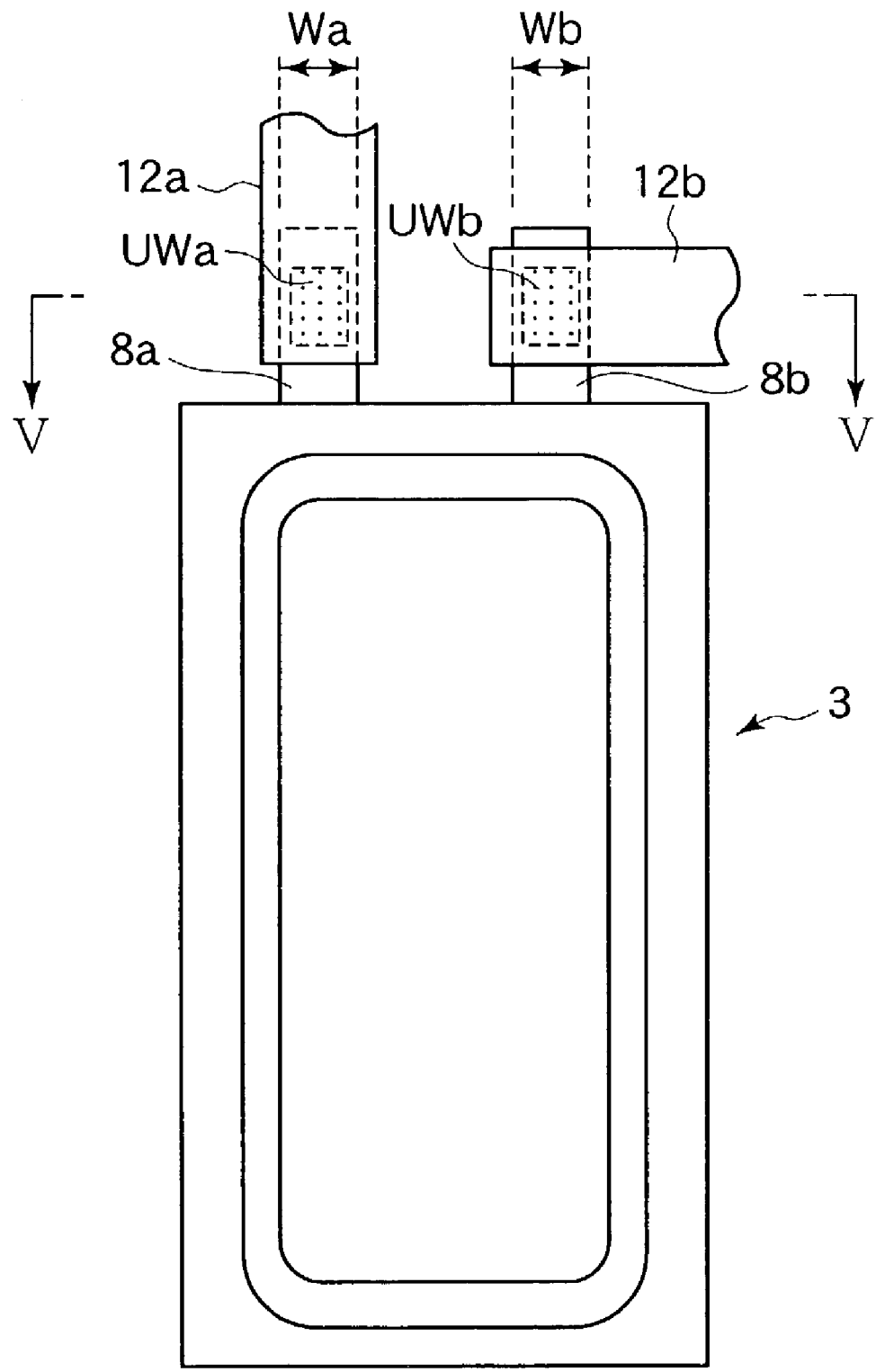
FIG. 3 is a front view of FIG. 1.
Figure 4:
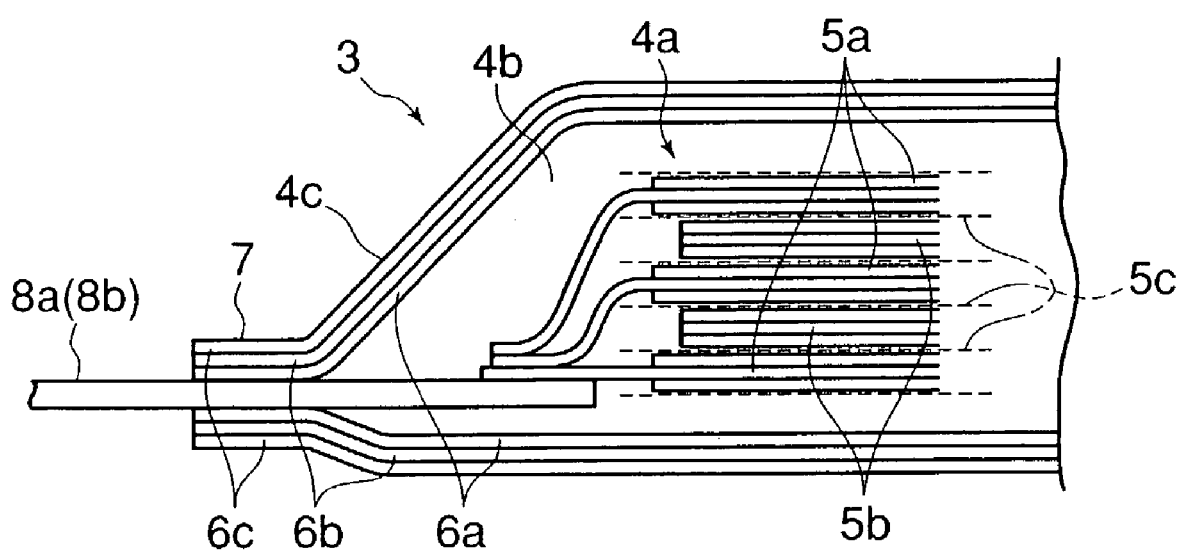
FIG. 4 is a cross sectional view of IV—IV line of FIG. 1 and it shows a magnified view of the section circled by circle IV in FIG. 2.

In FIG. 1 to FIG. 4, Code 3 is a sheet-type lithium ion secondary cell (sheet-type secondary cell), internal electrode couple 4a and electrolytic solution 4b are contained in flexible outer wrapper of envelope type 4c. As shown in FIG. 4, internal electrode couple 4a is in sheet type with sheet-type positive electrode 5a, which is formed by laminating positive electrode active material on both sides of the positive electrode current collector made of aluminum, and negative electrode 5b, which is formed by laminating negative electrode active material on both sides of the negative electrode current collector made of copper, being laminated alternately through separator 5c, and positive electrode 5a in the said internal electrode couple 4a and positive electrode terminal 8a which are connected individually to each other penetrate, air-tight, through the heat sealing section 7 of outer wrapper of envelope type 4c as well as being fixed to this heat sealing section 7 and penetrating into outside through the heat sealing section 7, the portion thus drawn out being used as an outer lead. Also, although omitted in the drawing, negative electrode terminal 8b is also individually connected to negative electrode 5b and said negative electrode terminal 8b is drawn out, air-tight, from the outer wrapper of envelope type 4c.

To the positive electrode terminal 8a and the negative electrode terminal 8b, sheet-type bus-bars 12a (12b) made of copper are connected, respectively. Under this embodiment, the connection of the interval between the positive electrode terminal 8a and bus-bar 12a and the interval between the negative electrode terminal 8b and bus-bar 12b are made by ultrasonic welding. Also, the positive electrode terminal 8a is made of aluminum just like the above-mentioned positive electrode current collector, and the negative electrode terminal 8b is made of copper or nickel just like the above-mentioned negative electrode current collector.

In this Embodiment 1, the above-mentioned outer wrapper of envelope type 4c is formed by a laminated film of three layer structure having inner surface layer 6a made of polyethylene on the inner surface side, middle layer 6b made of aluminum foil in the middle and outer surface layer 6c made of nylon on the outer surface side. Although, as separator 5c, any material having electric insulation and sufficient strength to ensure close contact with positive electrode 5a and negative electrode 5b, such as perforated film, nonwoven fabric, mesh, etc. of single layer or multi layers made of polyethylene, polypropylene, etc. may be used, polypropylene is used in this invention in view of its adhesiveness, safety, etc. As the solvent and electrolytic salt used for electrolytic solution 4b which is used as ion conducting material, nonaqueous solvent and electrolytic salt containing lithium which are used in the conventional cells can be used. Concretely, as the solvents, esters such as ethylene carbonate, propylene carbonate, dimethyl carbonate, diethyl carbonate, methylethyl carbonate, etc. and ethers such as dimethoxy ethane, diethoxy ethane, diethyl ether, dimethyl ether, etc. can be used as a single solvent and as a mixture of two kinds of solvents in the above-mentioned same group or in the different groups. A mixture of ethylene carbonate and diethyl carbonate is used in this invention. Also, as the electrolytic salt, $LiPF_6$, $LiAsF_6$, $LiClO_4$, $LiBF_4$, $LiCF_3SO_3$, $LiN(CF_3SO_2)_2$, $LiC(CF_3SO_2)_3$, $LiN(C_2F_5SO_2)_2$, etc. can be used. $LiPF_6$ is used in this invention.

In Embodiment 1, the thickness of each terminal 8a (8b) (positive electrode terminal 8a and negative electrode terminal 8b) is 100 μm and its width Wa and Wb is 3.0 mm. The sheet-type secondary cell formed in this invention is appropriately adopted for uses requiring a large electric current discharge such as, for example, use in electric automobiles, etc., and, in this regard, it is desirable that the width of each terminal is large to a certain extent. Also, by securing a large width of the terminal, it becomes possible to firmly fix the sheet-type secondary cell through bus-bars inside the casing, etc. In a hybrid car (HEV), etc., for example, electric current of more than 50 A is discharged instantaneously, and, assuming the discharge of such a large electric current, a cross sectional area of more than 2 $mm^2$ is desirable. If the width of each terminal is set at 100 μm, which is the figure generally used in this kind of cell, the width in concrete terms is preferably more than 20 mm, more preferably more than 30 mm, and further more preferably more than 40 mm.

In case the width of the terminal exceeds 50 mm, however, heat is drawn by the terminal at time of melting and adhesion of the outer wrapper of envelope type made of a heat melting resin, which is performed to closely fix the outer wrapper of envelope type to the terminal, and this makes it hard for the outer wrapper of envelope type to melt and difficult for the terminal to be closely fixed to it, thus sometimes causing a leakage of electrolytic solution 4b, which is not desirable. It is preferable that the maximum of the width of the terminal be set 45 mm or under. There is no specific limitation on the thickness of each terminal 8a (8b), as far as it meets the condition of the cross sectional area which is mentioned later.

In Embodiment 1, the cross sectional area Aa of the bus-bar 12a is 8 $mm^2$ and the cross sectional area Ba of the positive electrode terminal 8a is 3 $mm^2$. The cross sectional area of the bus-bar 12b and the negative electrode terminal 8b are the same as those on the side of positive electrode, respectively, except the cut edge angle of the cross section differs by 90 degrees. Although explanations are made only on the side of positive electrode, the same applies also on the side of negative electrode. Also, the position to which a bus-bar is fixed, its direction and the cut edge in this invention are not limited to those shown in Embodiment 1.

In Embodiment 1, the surface area SAa of the bus-bar 12a is 8 $mm^2$ and the surface area SBa of the positive electrode terminal 8a is 4 $mm^2$; Like this, if the surface area SAa of the bus-bar 12a is larger than the surface area SBa of the positive electrode terminal 8a to which the former is connected, the heat transmitted from the positive electrode terminal 8a is effectively radiated. In this invention, as mentioned above, it is preferable that the surface area of the above-mentioned bus-bar be more than the surface area of the terminal to which the former is connected, more preferably, its area be more than 1.5 times of the surface area of said terminal.

It is inevitable, in this invention, that the relationship between the cross sectional area Aa of bus-bar 12a and the cross sectional area Ba of positive electrode terminal 8a be, $Aa \geq 0.5 \times Ba$ (that s, if the distinction between positive and negative is omitted, $A=0.5 \times B$, and so forth), preferably $Aa \geq 1.0 \times Ba$ and, more preferably, $Aa \geq 1.5 \times Ba$. By setting the cross sectional area Aa of bus-bar 12a at more than the cross sectional area Ba of positive electrode terminal $8a \times 0.5$, preferably more than that, heat can be effectively diffused from bus-bar 12a.

Also, it is preferable, in this invention, that the relationship between the cross sectional area A ($mm^2$) of bus-bar 12a (12b) and the average electric charge current I (A) from the sheet-type secondary cell 3 meet the following formula (1)

$$A/I \geq 0.5 \tag{1}$$

By adjusting the cross sectional area A of bus-bar 12a (12b) to meet the above-mentioned formula (1), an efficient heat radiation characteristic can be secured without electric discharge current. It is more preferable to set the right side member of the above formula (1) at 0.8.

In Embodiment 1, bus-bar 12a (12b) with width of 8 mm and thickness of 1 mm was used. In this invention, there is no specific limitation on the largeness of these figures, as far as the cross sectional area A meets the conditions already mentioned. With regard to the thickness, however, it is preferable that it be more than 0.4 mm, more preferably more than 0.8 mm, in view of the sheet-type secondary cell being firmly fixed in the desired casing, etc. by the bus-bar 12a (12b) and the bus-bar not being damaged at time of its connection to the terminal.

In the Embodiment 1, copper was used for bus-bar 12a (12b). There is, however, no specific limitation regarding its material and any metal material can be used without problem, and it is preferable to use a metal material with en excellent heat conductivity. In particular, preferable examples are copper, aluminum, nickel, phosphor bronze, brass, etc.

In Embodiment 1, aluminum was used for positive electrode terminal 8a and nickel for negative electrode terminal 8b. There is, however, no specific limitation regarding its material, and it is preferable to use a metal material with a stable electrochemical capacity. In particular, a preferable example is to use aluminum, aluminum alloy, etc. for positive electrode terminal 8a and copper, stainless steel, nickel, etc. for negative electrode terminal 8b. It is also preferable to use the same material as that used for the positive electrode current collector, such as aluminum, for positive electrode terminal 8a, and to use copper and/or nickel for negative electrode terminal 8b.

Regarding the thickness of each terminal 8a (8b), those with 100 μm was used in Embodiment 1. It is better to use those with thickness, for example, more than 50 μm or around, preferably those of strip shape of 100~200 μm.

In Embodiment 1, both bus-bars 12a (12b) are made of a material having a higher thermal conductivity than that of those used for terminals 8a (8b) to which they are connected. By using a material of a higher thermal conductivity on the side of bus-bar than the side of terminal, heat can be effectively conducted from said terminals and can be efficiently diffused. As combinations of materials for the bus-bar and the terminal having this relationship of thermal conductivity, for example, there are combinations in which aluminum or nickel is used for the terminal when copper is used for the bus-bar, nickel is used for the terminal when aluminum is used for the bus-bar, etc.

As already described, the connection between positive electrode terminal 8a and bus-bar 12a and the connection between negative electrode terminal 8b and bus-bar 12b is made by ultrasonic welding. The connection in this invention is not limited to this but it can be made by various means. Considering the connection performance and the productivity, however, ultrasonic welding and/or caulking by rivets are preferable. In particular, when welding multiple sections by ultrasonic welding, it is preferable to use the caulking by rivets at the same time so that the already welded section does not exfoliate due to a subsequent welding.

The wording "caulking by rivets" means that, by using solid rivet, full tubular rivet, semi tubular rivet, split rivet, compresshock rivet, blind rivet, etc., two materials are penetrated by a rivet and are connected to each other by caulking both ends or one end of said rivet.

As other methods of connection, examples may be shown, in which studs are vertically installed at whole or fixed sections on one of the two materials, which are then inserted into the penetrated holes provided on the other material, and then the edge of the studs are caulked to fix the materials, as well as using bolts, nuts, etc.

When using rivets, it is preferable to use rivets of the same material as that for positive electrode terminal 8a with regard to the rivets which connect the interval between the positive electrode terminal 8a and bus-bar 12a and to use rivets of the same material as that for positive electrode terminal 8b with regard to the rivets which connects the interval between the negative electrode terminal 8b and bus-bar 12b. By doing so, it is possible to reduce contact resistance as well as prevent, beforehand, any thermal deformation from occurring due to the difference in the thermal expansion coefficient.

Figure 5:
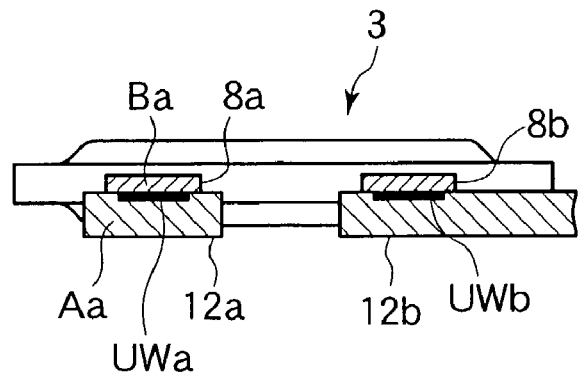
FIG. 5 is a cross sectional view of V—V line in FIG. 3.

A cross sectional view of V—V in FIG. 3 is shown in FIG. 5. In Embodiment 1, the ultrasonic welded joint section on the connection part of positive electrode terminal 8a and bus-bar 12a is UWa and the ultrasonic welded joint section on the connection part of negative electrode terminal 8b and bus-bar 12b is UWb, both having an area of 4 cm². In case ultrasonic welding is used to connect the terminal and the bus-bar in this invention, it is preferable that the following formula (2) be met with regard to the relationship between the total joint area W (cm²) of ultrasonic welding on the connection part of one bus-bar (12a or 12b) and the average electric charge current I (A).

$$W/I \geq 0.1 \tag{2}$$

By satisfying the above formula (2), the thermal conductivity and the electric conductivity between the positive electrode terminal 8a or negative electrode terminal 8b and the bus-bar 12a or bus-bar 12b becomes extremely good. It is especially preferable that the right side member of the above formula (2) be 0.15.

Figure 6:
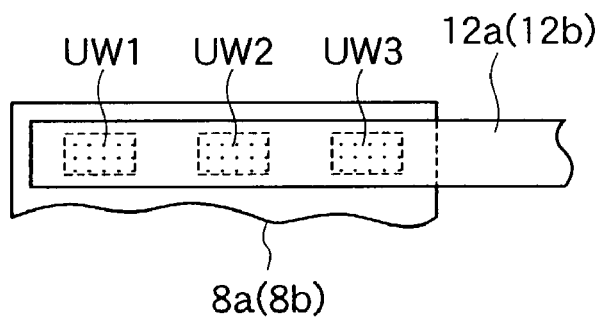
FIG. 6 is an illustration which shows an example of the state of connection of the terminal and the bus-bar.

The term "total joint area W" of ultrasonic welding as used herein means the area of the joint section itself when, as in Embodiment 1, the welding of each connection part is done at one joint section. However, as shown in FIG. 6 for example, when the terminal 8a (8b) and the bus-bar 12a (12b) are welded at multiple joint sections of ultrasonic welded such as 3 sections of UW1, UW2 and UW3, the total of the area of these multiple joint sections of UW1, UW2 and UW3 corresponds to "total joint area W".

Figure 7:
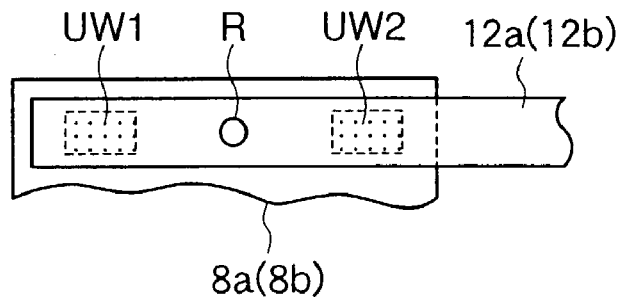
FIG. 7 is an illustration which shows another example of the state of connection of the terminal and the bus-bar.

Also, in case, as shown in FIG. 7 as an example, the terminal 8a (8b) and bus-bar 12a (12b) are welded by ultrasonic welding at two joint sections of UW1 and UW2 as well as being fixed by caulking by rivet R, the total of the area of ultrasonic welded joint sections UW1 and UW2 and the area of the joint section firmly in contact by rivet R corresponds to "total joint area W".

Figure 8:
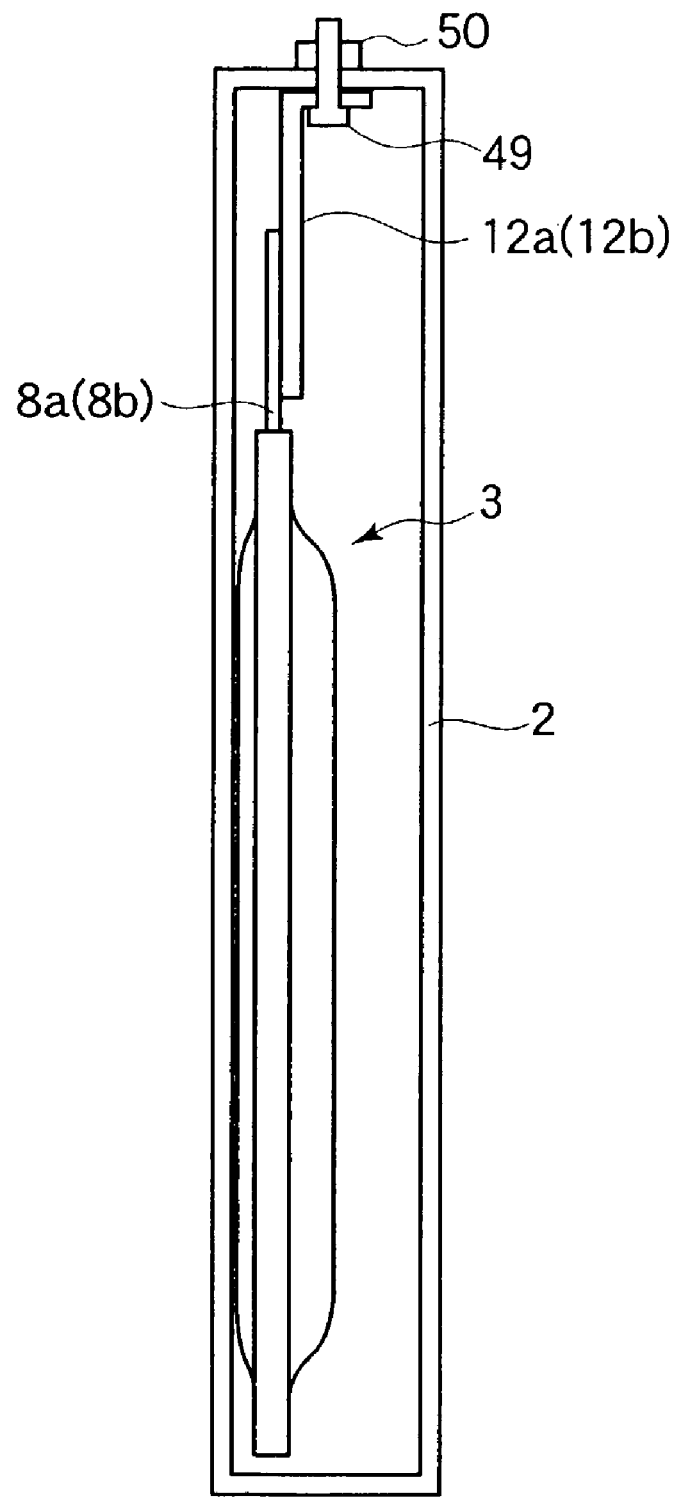
FIG. 8 is a cross sectional illustration of the secondary cell module with a casing in which the combination cell of FIG. 1 is contained.

The electrode connection structure in Embodiment 1 enables the production of a secondary cell with an excellent mechanical strength as well as with high thermal radiation and electric properties, by fixing it in a desired container by bus-bar 12a (12b). FIG. 8 is a sectional side elevation of the secondary cell having the electrode connection structure of Embodiment 1. The sheet-type secondary cell 3 forms a secondary cell which can be put into practical use by being contained in the casing 2 and with bus-bar 12a (12b) being fixed to the container from inside by screws 49 and nuts 50. In this secondary cell, screws 49 and nuts 50 constitute outer electrode terminal.

Figure 9:
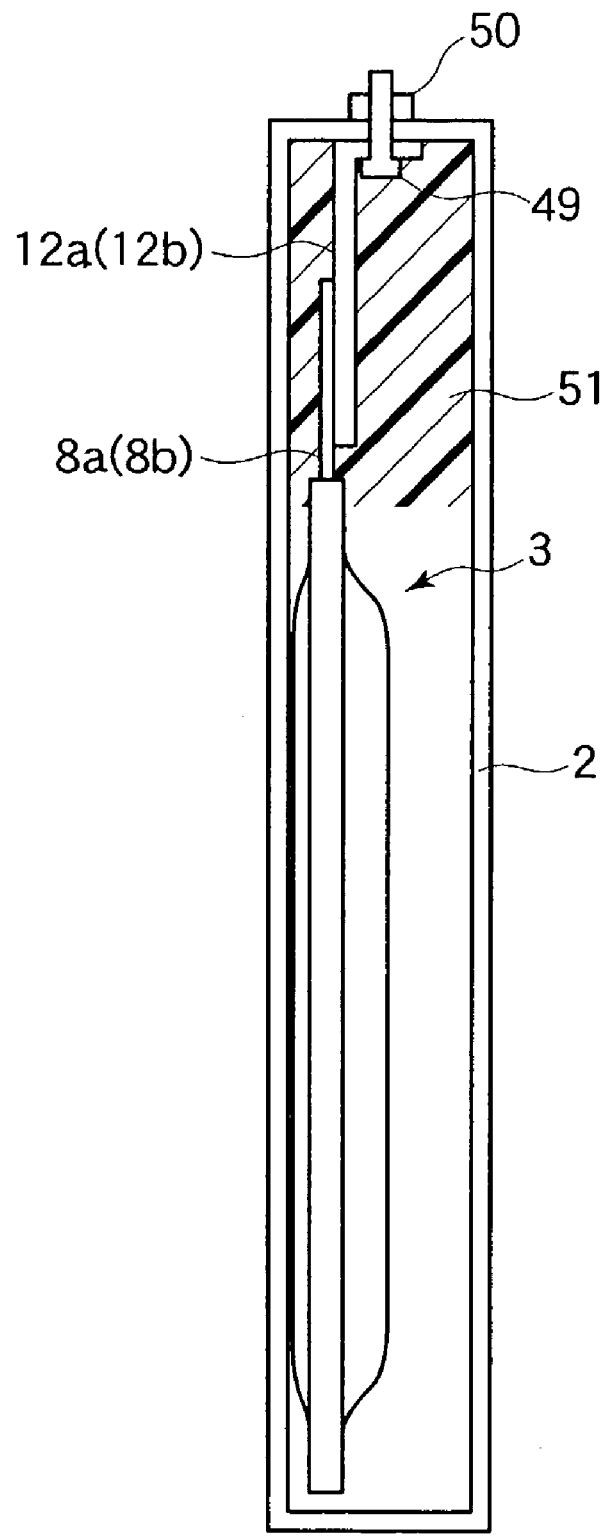
FIG. 9 is a cross sectional illustration which shows the mold state of the bus-bar and the section around the terminal in the secondary cell module of FIG. 8.

Also, as shown in FIG. 9, it is preferable that the surrounding area of the bus-bar 12a (12b) and the terminal 8a (8b) to which the former is connected is molded by the loading material of resin 51. In case the bus-bar 12a is made thick as compared to the positive electrode terminal 8a, the joint of the positive electrode terminal 8a connected to the bus-bar 12a and its vicinity becomes mechanically weak, which mechanical strength can be reinforced by molding it by the loading material of resin 51. By reinforcing this mechanical strength, it is possible, when it is installed in an automobile as an example, to prevent beforehand possible short-circuit of the secondary cell forming the combination cell inside the casing 2 and the plasmotomy of the positive electrode terminal 8a when the vibration at time of running and shock at time of collision applies.

Also, although in FIG. 9 only the portion surrounding the bus-bar 12a (12b) and the terminal 8a (8b) is molded by the loading material of resin 51, molding is not limited to this, and a model of mold case in which, for example, the whole portion inside the casing 2 is molded may be used.

Also, in Embodiment 1, the bus-bar 12a (12b) are explained as those to be fixed to the casing 2, they are not necessarily limited to these uses and may be used only for heat radiation. In this case, these are fixed to the container, etc. by other means.

According to the secondary cell module in Embodiment 1 as explained above, the heat of each electrode 4a can be efficiently transmitted to the bus-bar 12a (12b) through the terminal 8a (8b), as well as each of these terminals 8a (8b) itself also having thermal radiation effect. Also, since sheet-type metal bus-bar 12a (12b) having a cross sectional area which is larger than the total cross sectional area of each of these terminals 8a (8b) are connected at outside of the outer wrapper of envelope type 4c, the heat transmitted from each terminal 8a (8b) can be efficiently diffused. Also, although in the examples in Embodiment 1, the cross sectional area and material of the bus-bar 12a (12b), the width and cross sectional area of the terminal 8a (8b), method of connection of these and welded area, etc. are the same for the positive electrode and the negative electrode, these need not necessarily be the same for both electrodes in this invention.

[Variation Model 1]

Figure 10:
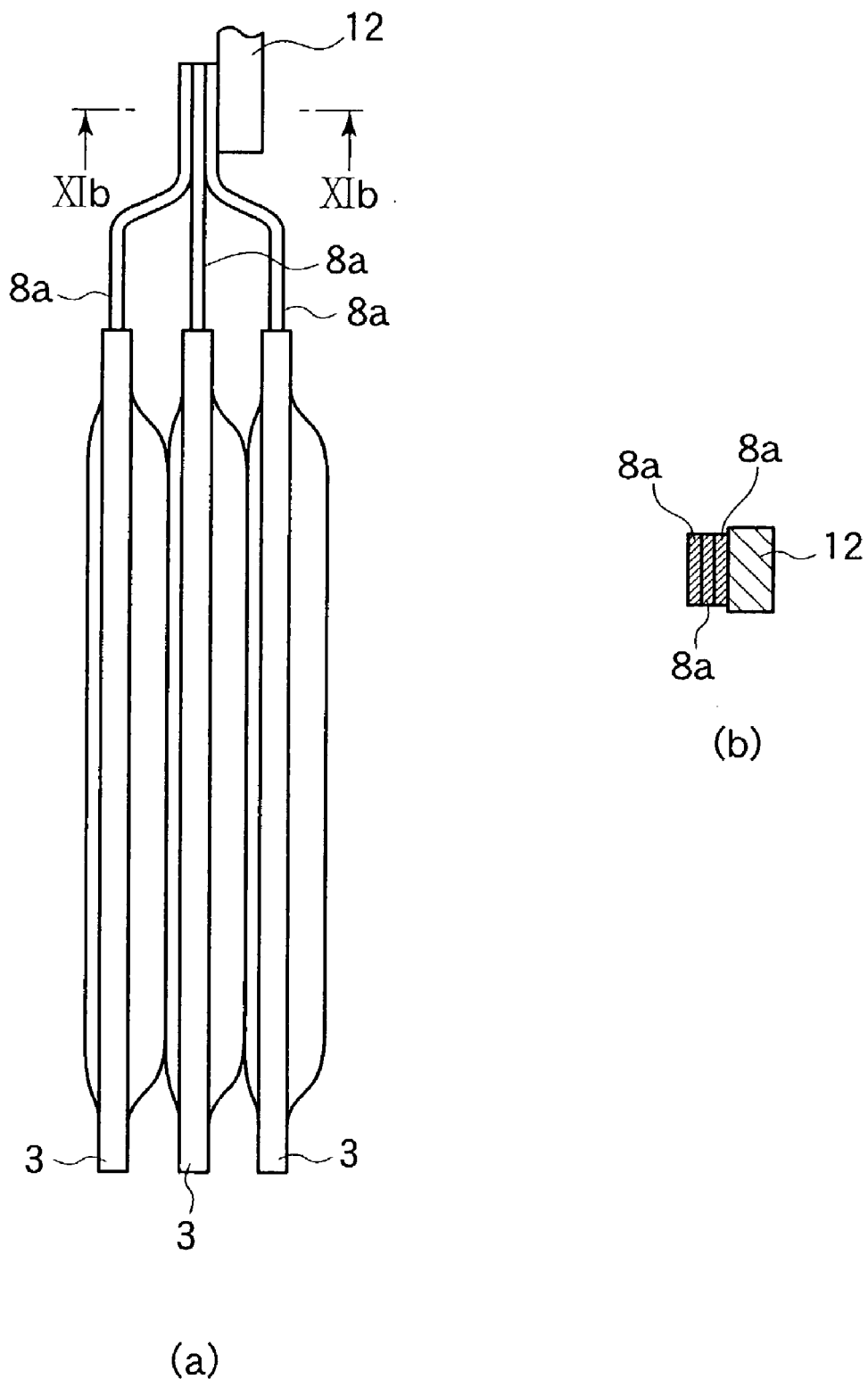
FIG. 10 is an illustration showing another example of the combination cell of the secondary cell module relating to the variation model of Embodiment 1, where (a) is a cross sectional view and (b) is a cross sectional view of XIb—XIb line in (a).
Figure 11:
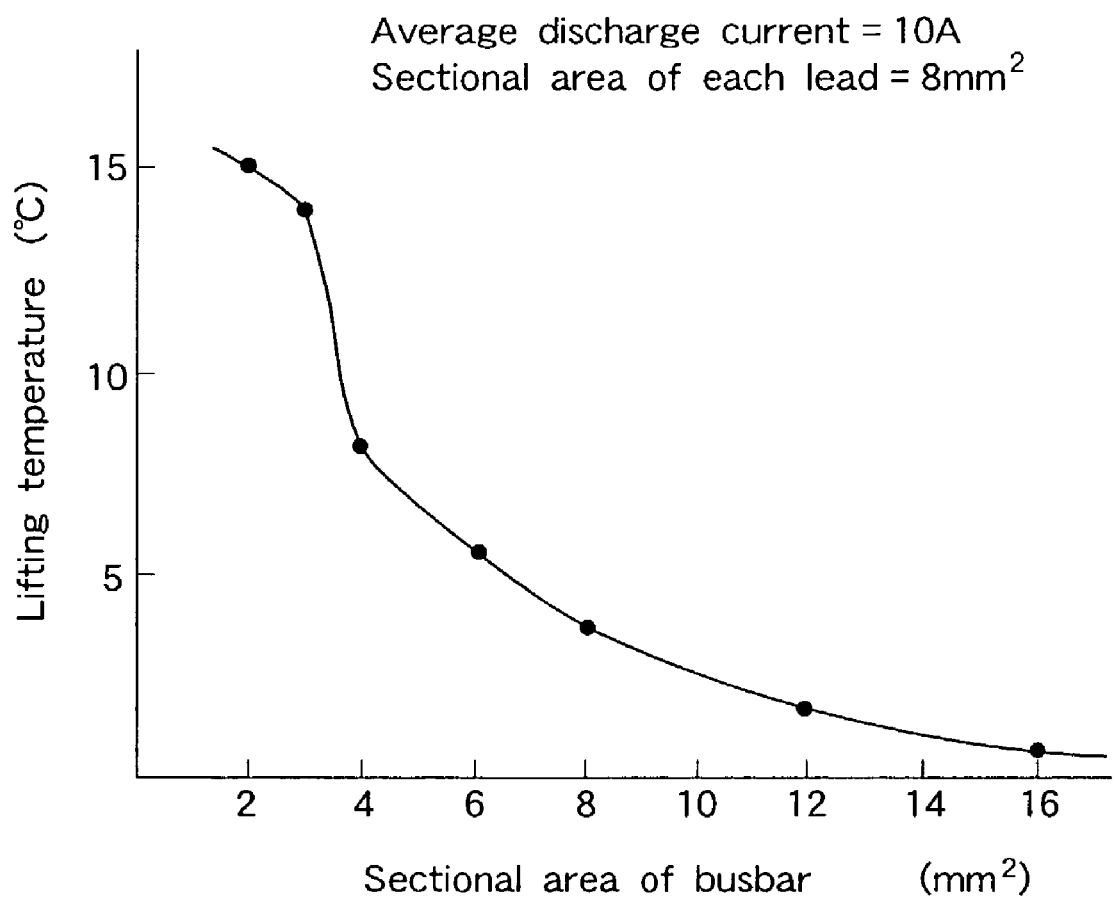
FIG. 11 is a graph of cross sectional area (mm) of the bus-bar—temperature rise (C) which shows the result of Test Model 1.

In FIG. 10, three secondary cells 3 of sheet-type are laminated, each positive electrode terminal 8a drawn out from the outer wrapper of each sheet-type secondary cell 3 are bundled together, and the bus-bar 12 is fixed to the bundled portion by ultrasonic welding. Also, although not shown in the drawing, the negative electrode terminals drawn out from the outer wrapper of envelope type of each secondary cell 3 are also bundled together just like positive electrode terminals 8a, and the bus-bar for the negative electrode is fixed to the bundled portion by ultrasonic welding. That is, the connection in this embodiment is a parallel connection, in which the positive electrodes and the negative electrodes of multiple sheet-type secondary cells are independently connected with each other, respectively.

Each of these sheet-type secondary cells 3 is the same, which is also the same as the sheet-type secondary cell 3 used in Embodiment 1, and since the preferred status and condition are also the same, detailed explanations are therefore being omitted.

In this variation model, the cross sectional area A of the bus-bar 12 is 12 mm$^2$ and the cross sectional area of each positive electrode terminal is 3 mm$^2$. In this invention as described earlier, since the "total cross sectional area of each terminal" indicates the area of the total electrode terminals drawn out and bundled in case there are more than two sheet-type secondary cells, the total cross sectional area of the terminals of the positive electrode side is 9 mm$^2$, which exceeds the cross sectional area A of the bus-bar 12.

Therefore, in the secondary cell module in this variation model, too, the heat of each electrode can be efficiently transmitted to the bus-bar 12 through the terminal 8a (8b), as well as each of these terminals itself having thermal radiation effect. Also, since the sheet-type metal bus-bar 12 having a cross sectional area of more than the total cross sectional area of each terminal 81a (8b)×1.0 on the outside of the outer wrapper of envelope type, the heat transmitted from each terminal 8a (8b) can be efficiently diffused.

In this variation model, too, as in the case of Embodiment 1, by fixing the secondary cell in a preferred container, a secondary cell module having an excellent mechanical strength as well as a high thermal conductivity and excellent electric properties can be produced.

In this variation model, an example of 3 sheet-type secondary cells laminated and connected in parallel with each other was shown, but the cell lamination of the sheet-type secondary cells are not limited to 3 sheets, and 2 sheets or 4 sheets or more can be used. Also, the connection is not limited to parallel connection, and a series connection in which the positive electrode and the negative electrode of the sheet-type secondary cell are connected in series may be used as well as a combination of series connection and parallel connection being possible. Of course, in this case also, the concept of "total cross sectional area of each terminal" in this invention indicates the total cross sectional area of the bundle of terminals to which the bus-bar is to be connected.

[Result of Test]

The test data verifying the relationship between the cross sectional area Aa of bus-bar 12 and the cross sectional area Bb of positive electrode terminal is shown here for the secondary cell module of the above-mentioned Embodiment 1.

[Test Model 1]

In the secondary cell module in Embodiment 1 (where 2 sheet-type secondary cells 3 shown in Embodiment 1 are laminated just in the same way as in the case of the variation model and the bus-bar is connected to the terminals connected in series), a sheet-type secondary cell was produced by varying the cross sectional area A of the bus-bar 12a (12b) at levels of 2 mm$^2$, 3 mm$^2$, 4 mm$^2$, 6 mm$^2$, 12 mm$^2$ and 16 mm$^2$ in addition to 8 mm$^2$. The concrete specifications of the cell are as follows:

Cell capacity—3 Ah (5 hour rate)

Positive electrode terminal 8a—Width of 40 mm, thickness of 100 μm (200 μm when 2 sheets laminated)

Negative electrode terminal 8b—Width of 40 mm, thickness of 100 μm (200 μm when 2 sheets laminated)

Figure 1:
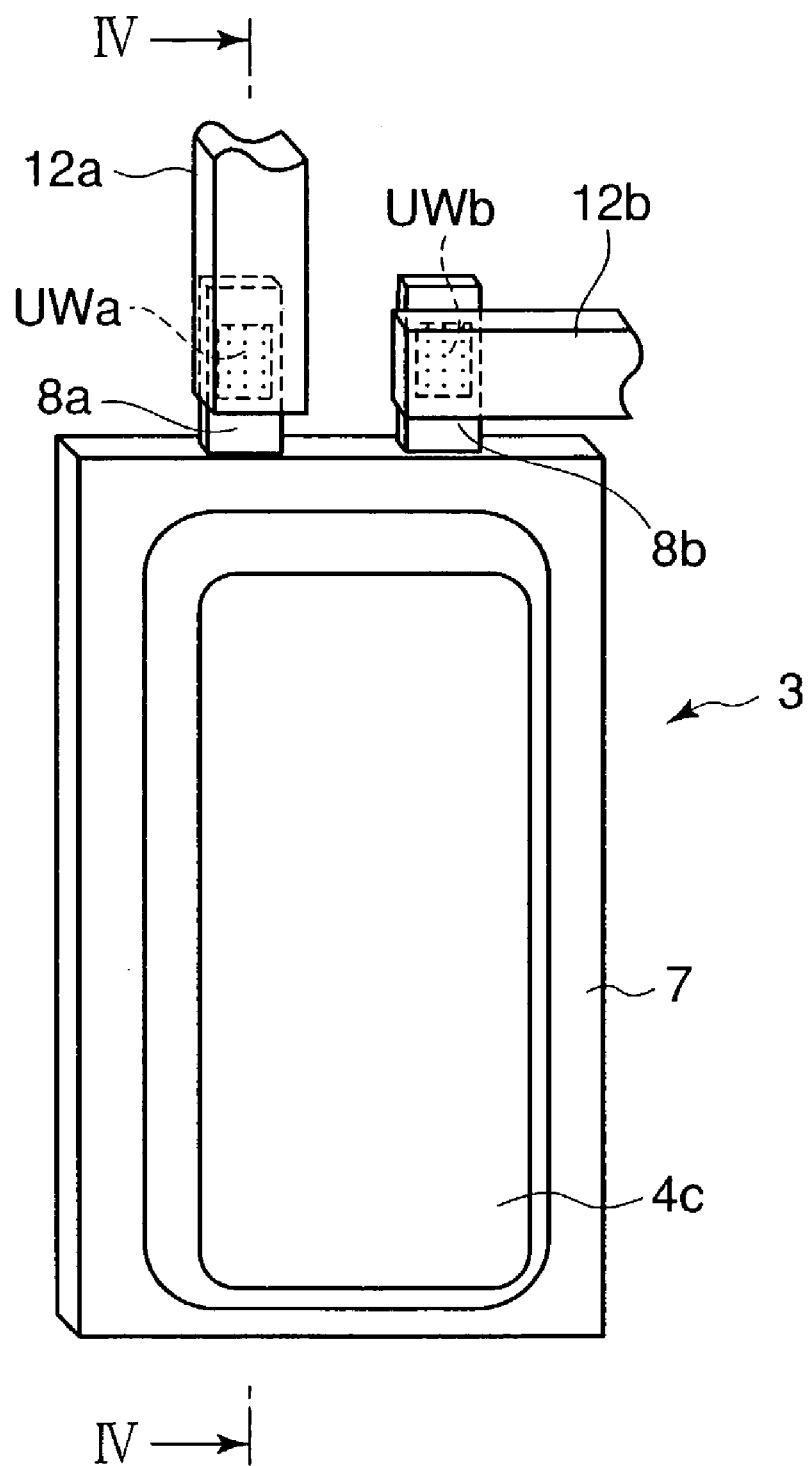
FIG. 1 is a partial perspective illustration which shows the electrode connection structure of the secondary cell used in the secondary cell module which relates to Embodiment 1 of this invention.
Figure 2:
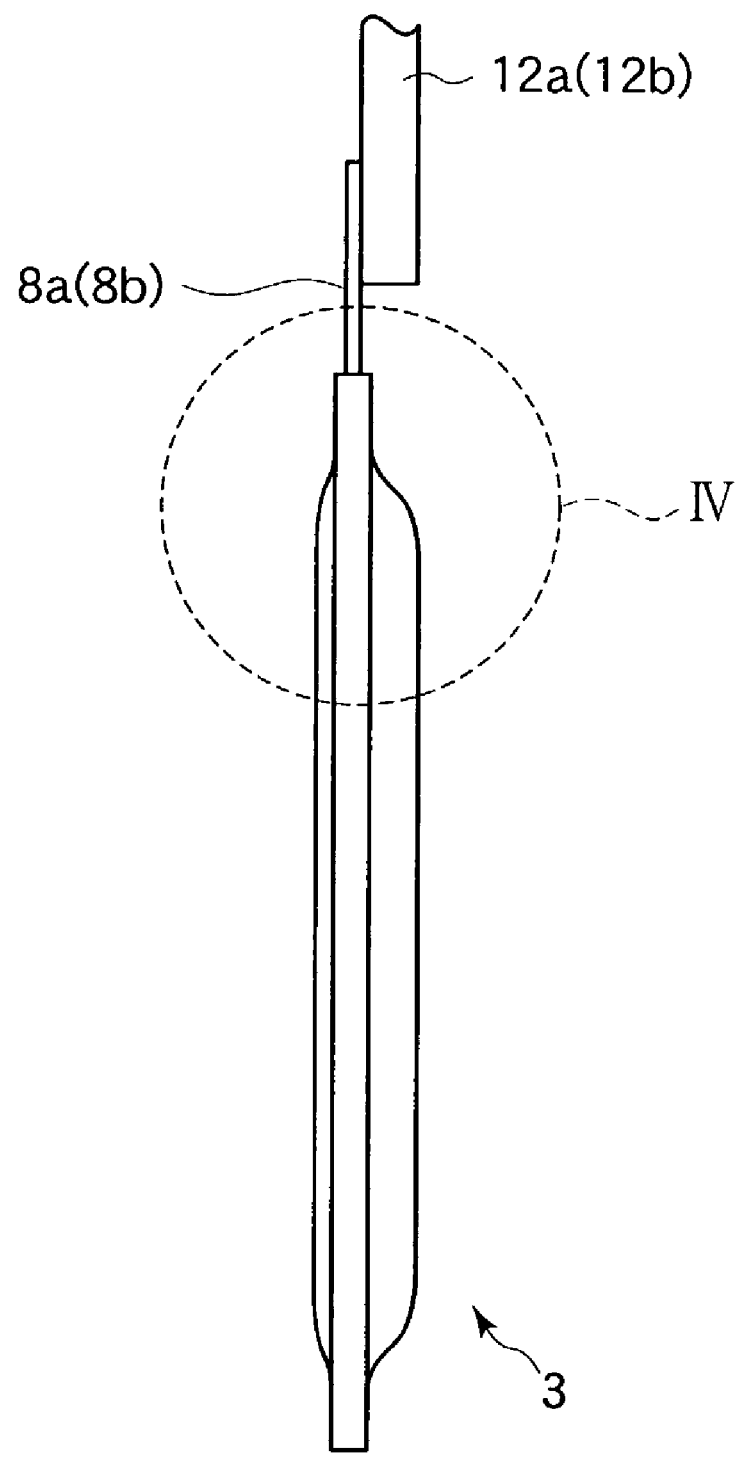
FIG. 2 is a left side view of FIG. 1.

With thermoelectric couple fitted at several sections on the surface of sheet-type secondary cell, electric current was discharged (40 V, 10 A) and the surface temperature of each secondary cell after ten minutes of discharge was monitored. By recording the temperature at sections of the highest temperature, the temperature rise on the surface of each secondary cell was confirmed. The relationship between the cross sectional area A (mm$^2$) of bus bar 12a (12b) and the lifting temperature C after 10 minutes is shown in FIG. 1.

As a result, when the cross sectional area of bus-bar 12a (12b) is 4 mm$^2$ which is half of the cross sectional area of the terminal 8a (8b), a turning point at which the lift of surface temperature slow down, and, in particular, when the cross sectional area of the bus-bar is more than 6 mm$^2$ where the relationship between the cross sectional area A (mm$^2$) of the bus-bar 12a (12b) and the average discharge current I'=10 (A)

meets A/I'≧0.5 (Formula (1')), the lift of temperature is maintained at extremely low levels.

[Test Model 2]

In the same secondary cell module as in Test Model 1, the lifting temperature on the surface of the sheet-type secondary cell was confirmed, just like in Test Model 1, by keeping the cross sectional area A of the bus-bar 12a (12b) at 8 mm² and by varying the average discharge current at 4 levels of 5 A, 15 A and 20 A in addition to 10 A.

Figure 12:
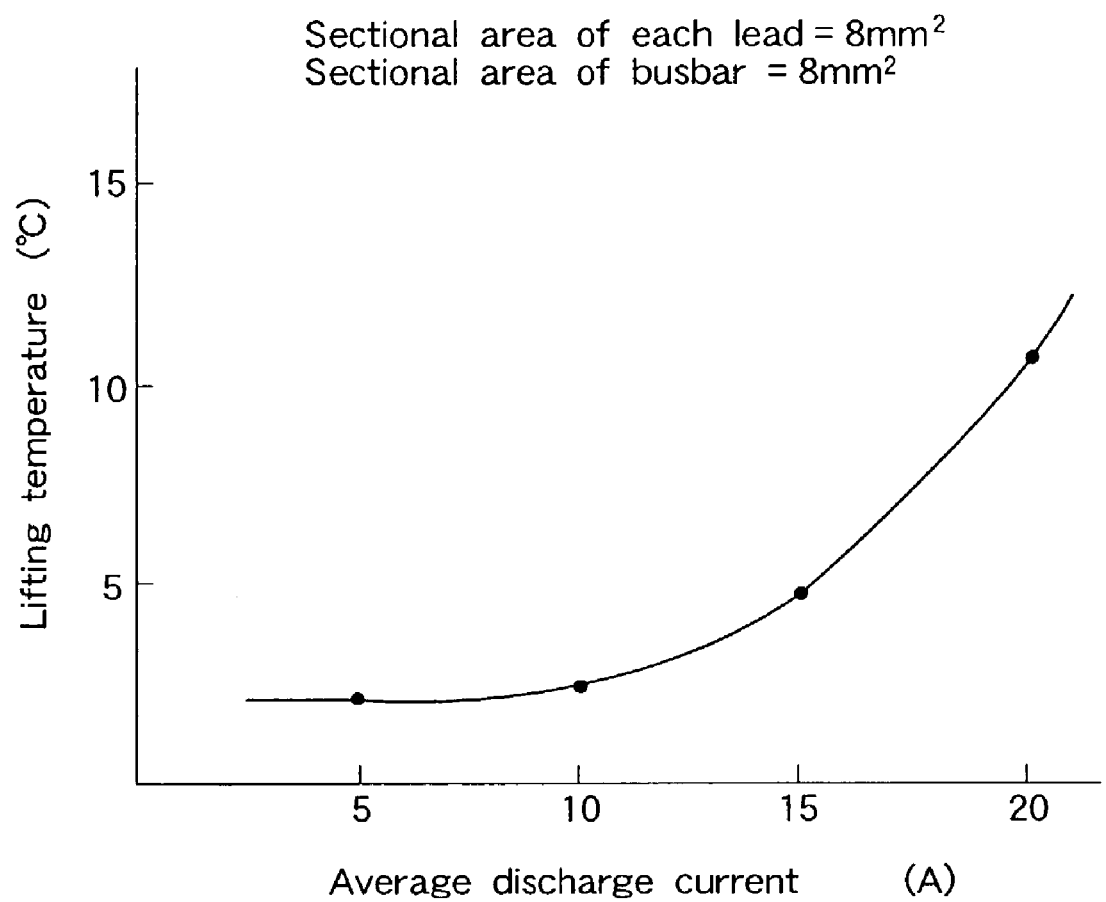
FIG. 12 is a graph of average charge current (A)—temperature rise (C) which shows the result of Test Model 2.

With thermoelectric couple fitted at several sections on the surface of sheet-type secondary cell, electric current was discharged and the surface temperature of each secondary cell after ten minutes of discharge was monitored. By recording the temperature at sections of the highest temperature, the temperature rise on the surface of each secondary cell was confirmed. The result is as shown in the graph of FIG. 12.

The result shows that, at average charge current I=15 (A) {A/I=0.53} where the relationship between the cross sectional area A=8 (mm²) of the bus-bar 12a (12b) and the average discharge current I (A) is close to A/I≧0.5 (Formula (1)), a turning point was observed at which the lifting of surface temperature slows down. In case the average discharge current I smaller than this (the figure of the left side number in Formula (1) being larger), the lifting of the surface temperature is kept at an extremely low level.

[Test Model 3]

In the secondary cell module in Embodiment 1, 10 pieces of test material A which was fixed to and contained in casing 2 and further molded by loading material of resin 51 were made as shown in FIG. 9. A heat-hardening resin was used for molding. On the other hand, 10 pieces of test material B without molding were made under the same condition of connection of electrodes.

Vibration tests were made on each of materials A and B in accordance with JIS C8711. That is, after the secondary cell were fully charged, they were vibrated for 90 minutes in the XYZ direction crossing at right angles with amplitude of 0.8 mm, frequency of 10 Hz⇔55 Hz and sweep rate of 1 Hz/minute under the environment of 20° C. On subsequently observing, visually, the state of the cell, especially, the state of connection of the terminal and the bus-bar, the problem of solution leakage, operation of safety valve, breakage, ignition, etc. did not occur for both materials. However, although no problem of external appearance occurred on molded test material A, one out of the 10 test material B without molding had slight crack on the terminal. This result shows that the molding by resin is effective in view of increasing the mechanical strength.

As explained above, the secondary cell module in this Embodiment 1 can provide an electrode connection structure which can efficiently diffuse the heat in the electrodes of a sheet-type secondary cell from its electrode terminal. This Embodiment 1 can also provide an electrode connection structure of the sheet-type secondary cell which can achieve a high contact strength electrically and mechanically as well as the above-mentioned efficient radiation of heat.

[Embodiment 2]

Figure 13:
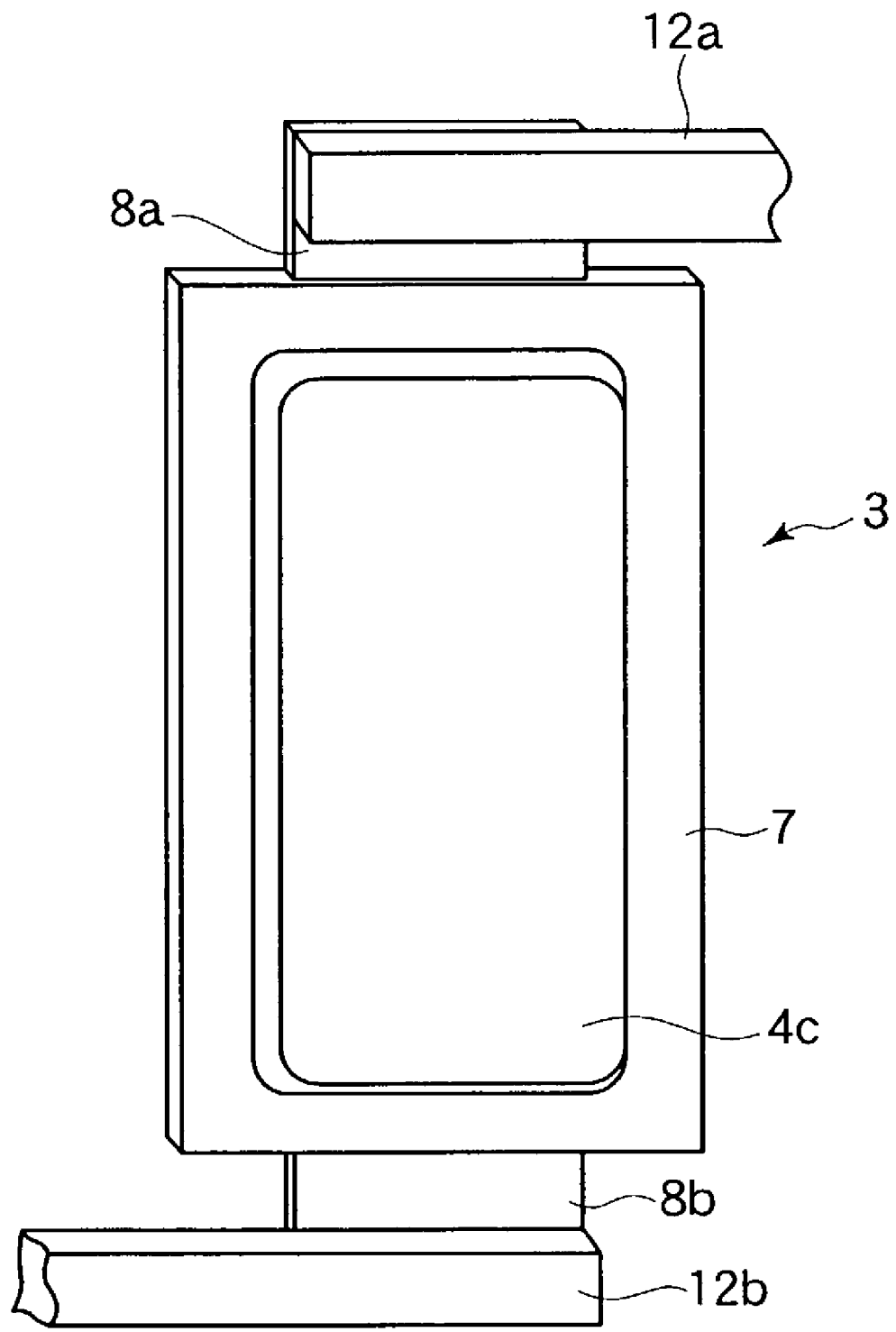
FIG. 13 is a partial perspective illustration which shows the electrode connection structure of the secondary cell in the secondary cell module relating to Embodiment 2 of this invention.

In FIG. 13, different from the above-mentioned Embodiment 1, the positive electrode terminal 8a made of aluminum is drawn out from the heat sealing part 7 at the upper hem of the outer wrapper of envelope type 4c and the positive electrode terminal 8b made of copper and/or nickel is drawn out from the heat sealing part 7 at the lower hem of the of the outer wrapper of envelope type 4c, and the bus-bar (cross sectional area: 8 mm) 12a (12b) made of copper is welded by ultrasonic welding to each of these terminals 8a (8b), respectively.

In this Embodiment 2, the width of each terminal 8a (8b) is 100 μm, their width Wa and Wb are both 30 mm, and the bus-bars 12a (12b) with width of 8 mm and thickness of 1 mm are used.

Figure 14:
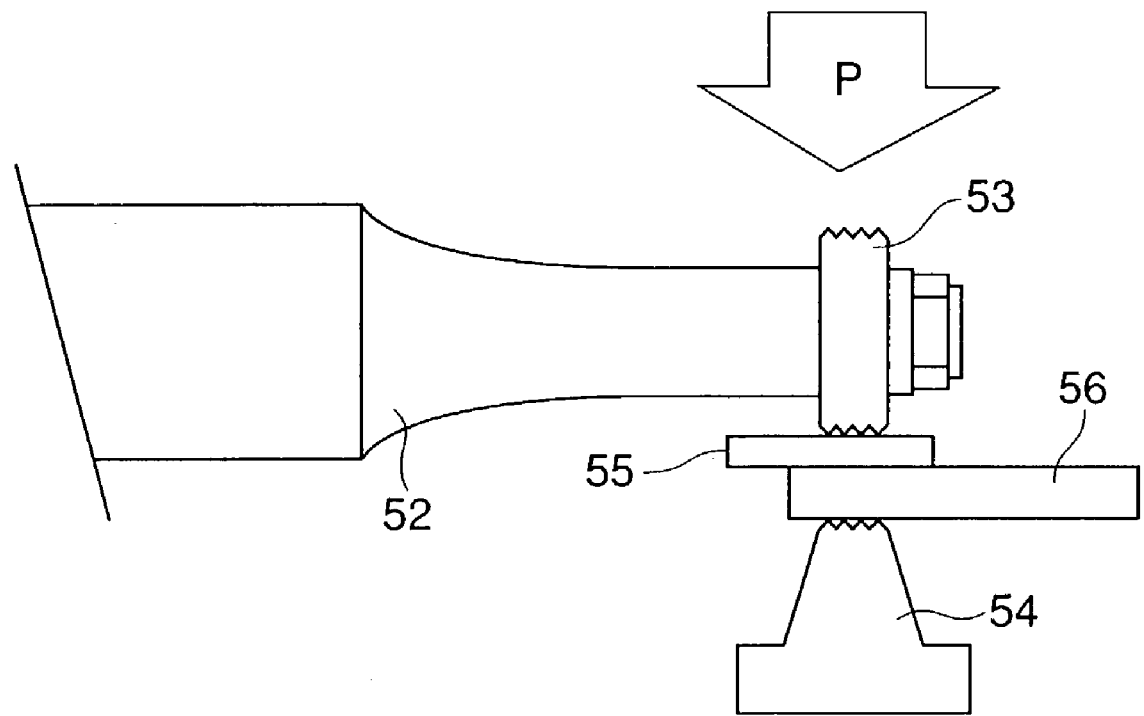
FIG. 14 is a schematic configuration illustration of the ultrasonic welding equipment for explaining the outline of the ultrasonic welding.

Explaining the ultrasonic welding here, as shown in FIG. 14, the ultrasonic welding device consist of horn 52, chip 53 installed on the front edge of horn, and anvil 54 positioned to face chip 53. When the 2 materials of object of junction (material of horn side 55 and material of anvil side 56) are positioned to overlap with each other in between the above-mentioned chip 53 and anvil 54 and clipped by chip 53 and anvil 54, pressurizing these by a prescribed pressure P and thus giving ultrasonic vibration onto horn 52, said ultrasonic vibration is transmitted to horn 55 and anvil 56 through chip 53 and the materials are connected by tangent effect, work effect and thermal effect.

Ultrasonic welding is characterized by that the welded surface is not fused or only extremely limited thin layers can be fused and a cleaning effect by the friction of impurities such as oxide film, etc. on the welded surface ca be expected. The conjunction resistance can be kept low, materials which are subject to junction are free from big damages, and a wide area of the materials can be firmly connected stably and at low cost.

Figure 15:
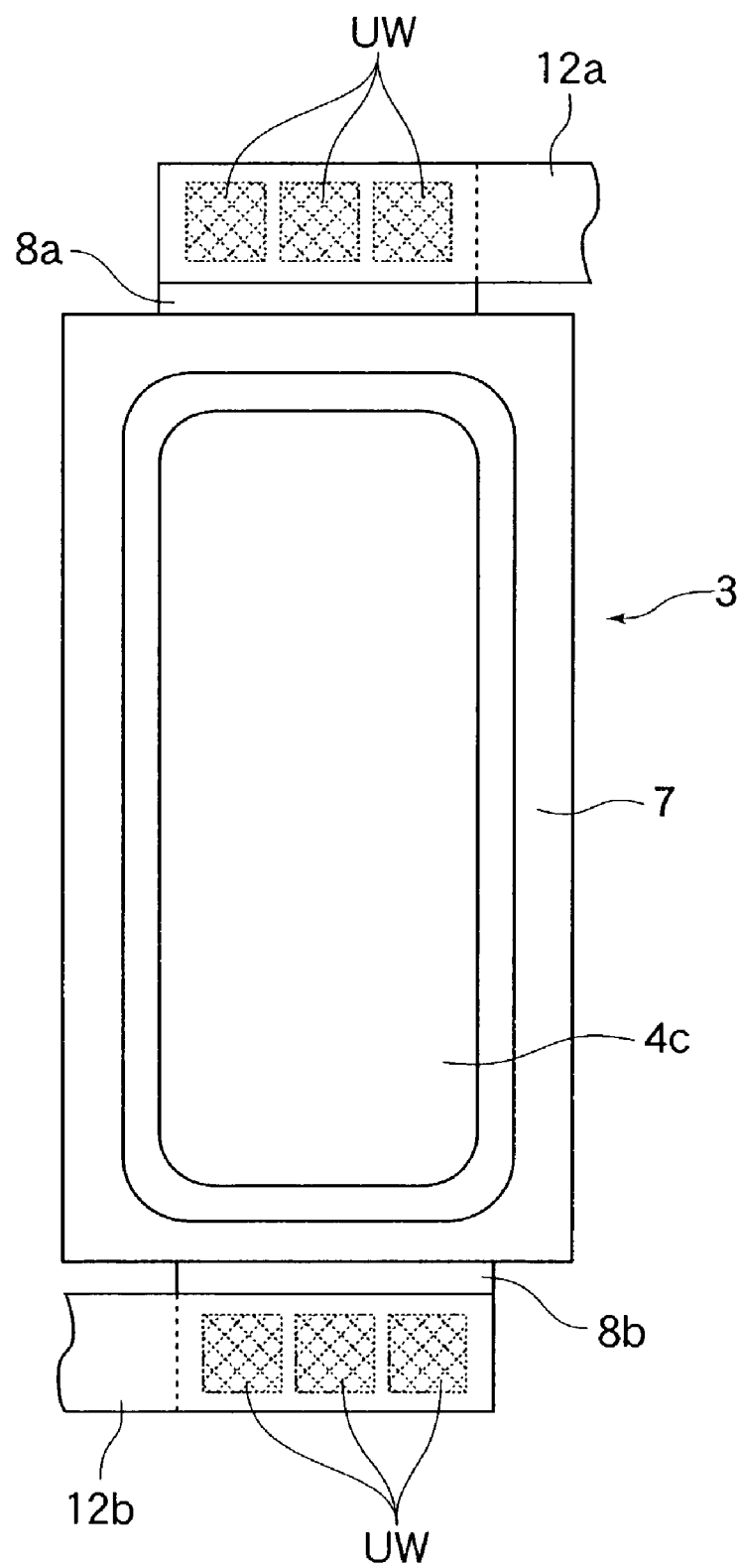
FIG. 15 is a plane illustration which shows, as a pattern diagram, the connection condition between the positive electrode terminal and bus-bar and the interval between the negative electrode terminal and bus-bar in the secondary cell in FIG. 13.

In this Embodiment 2, ultrasonic welding is performed by placing each electrode terminal 8a (8b) and bus-bar 12a (12b) as the material on horn side 55 and the material on anvil side 56, respectively. As shown in FIG. 15, the three joint sections UW having a size of (7 mm×7 mm=49 mm²) of the same shape (square) are formed between the positive electrode terminal 8a and bus-bar 12a and between the negative electrode terminal 8b and bus-bar 12, respectively, making the total joint area of 49 mm²×3=147 mm² for both joint sections.

Figure 16:
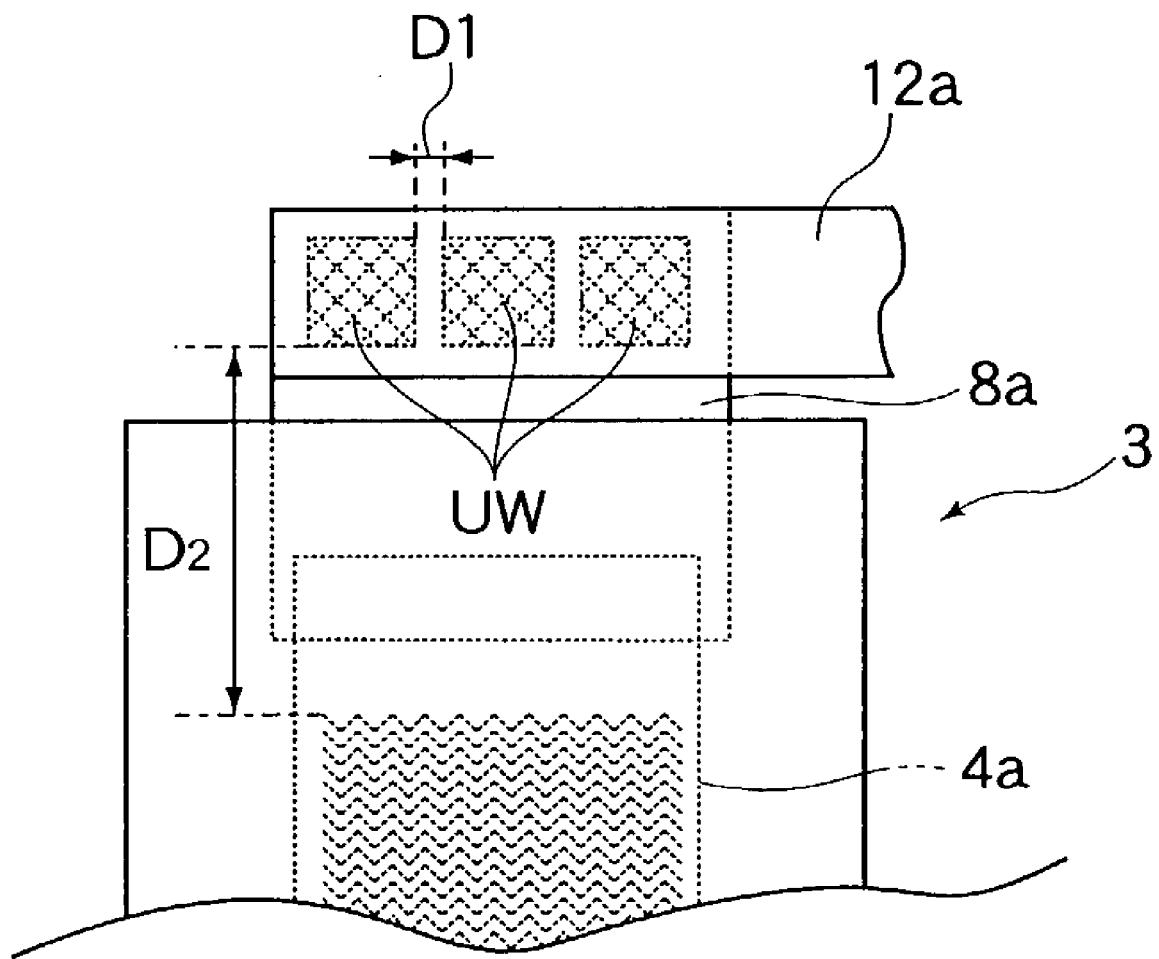
FIG. 16 is a plane illustration which shows in detail only the connection condition between the positive electrode terminals in the secondary cell in FIG. 13.

The state of connection on the positive electrode terminal 8a is shown in FIG. 16. In this Embodiment 2, the interval D1 between the joint sections UW adjacent to one another was set at 2 mm and the distance D2 between the joint section UW and the section of the positive electrode terminal on which positive electrode active material is applied was set at 10 mm.

[Variation Model 2]

Figure 17:
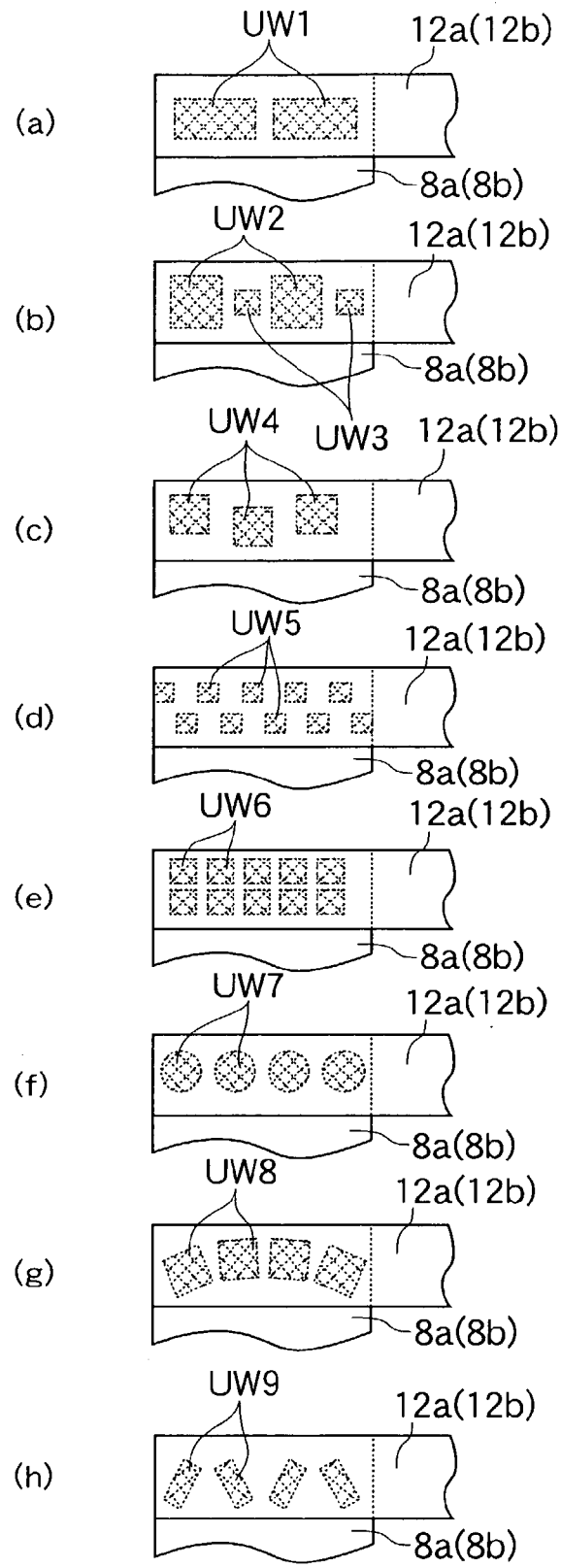
FIG. 17 is a plane illustration which lists adoptable examples of joint sections by the ultrasonic welding in the variation model of Embodiment 2 of this invention.

A variation model of the above Embodiment 2 is shown in FIG. 17, in which 8 examples of joint sections of ultrasonic welding which can be adopted in this invention are shown.

FIG. 17(a) shows an example in which joint sections UW1 which are of a rectangular shape and rather long are positioned in parallel with each other. The area in which the joint section UW1 is positioned is of a rectangular shape as a whole.

FIG. 17(b) shows an example in which a largish joint section UW2 of a rectangle shape and a smallish joint section UW3 of a rectangular shape are positioned alternately. The individual size of the joint section may not necessarily be the same as shown in this example. Also, the individual shape may be different. The area in which the joint sections UW2, UW3 are placed is roughly of a rectangular shape as a whole although it is rather irregular.

FIG. 17(C) shows an example in which the 3 joint sections UW4 of a rectangular shape are not positioned n a straight line. The sections on which joint sections are positioned may not necessarily be on a straight line as shown in this example. The area n which the joint section UW4 are placed is roughly of a rectangular shape as a whole although it is rather irregular.

FIG. 17(d) shows an example in which the joint sections UW5 of a small rectangle shape are positioned in 2 rows zigzag. As shown in this example, the sections on which the joint sections are positioned may not necessarily be on straight line. The area in which the joint sections UW5 are positioned are roughly of a rectangular shape as a whole although it is close to a parallelogram. In this example, the total of the width-direction length of the joint sections UW5 is equal to the width of terminal 8a (8b).

FIG. 17(e) shows an example in which the joint sections UW6 of a small rectangle shape are positioned in 2 rows in gridiron. The area in which the joint sections UW6 are positioned is of a rectangular shape as a whole.

FIG. 17(f) is an example which shows the joint sections UW7 of the same circular shape are positioned in a straight line. As shown in this example, the shape of the joint section may not necessarily be of a rectangular shape, and in addition to the circular shape in this example, elliptical shape, triangular shape, polygonal shape, star shape, indeterminate shape, etc. may be chosen or multiple shapes may also be chosen. The area in which the joint sections UW7 are positioned is roughly of a rectangular shape as a whole, although it has on both ends half circles with the same R as the radius of the circle of the joint section.

FIG. 17(g) shows an example in which the joint sections UW8 of a rectangle shape are positioned in a fan shape. As shown in this example, the sections on which the joint sections are positioned may not necessarily be in a straight line.

FIG. 17(h) shows an example in which the joint sections UW9 of a rectangle shape are positioned so that they slant against the inclination of the bus-bar hem and also the direction of this inclination are alternate. As shown in this example, if inclination is provided for each welded section, it is possible to change the direction of vibration at time of ultrasonic welding, making it difficult to receive any resonance.

[Test Model 4]

The total joint area W of the joint sections UW by ultrasonic welding of the connection part of each terminal 8a (8b) and the bus-bar 12a (12b) in the above Embodiment 2 was varied at 3 levels of 1 cm$^2$, 2 cm$^2$, and 3 cm$^2$ electricity (10 A) was discharged and, the lifting temperature on the surface of each secondary cell after 10 minutes of the discharge was confirmed, just as in the above Test Model 1. The result was as shown in the graph in FIG. 18.

Figure 18:
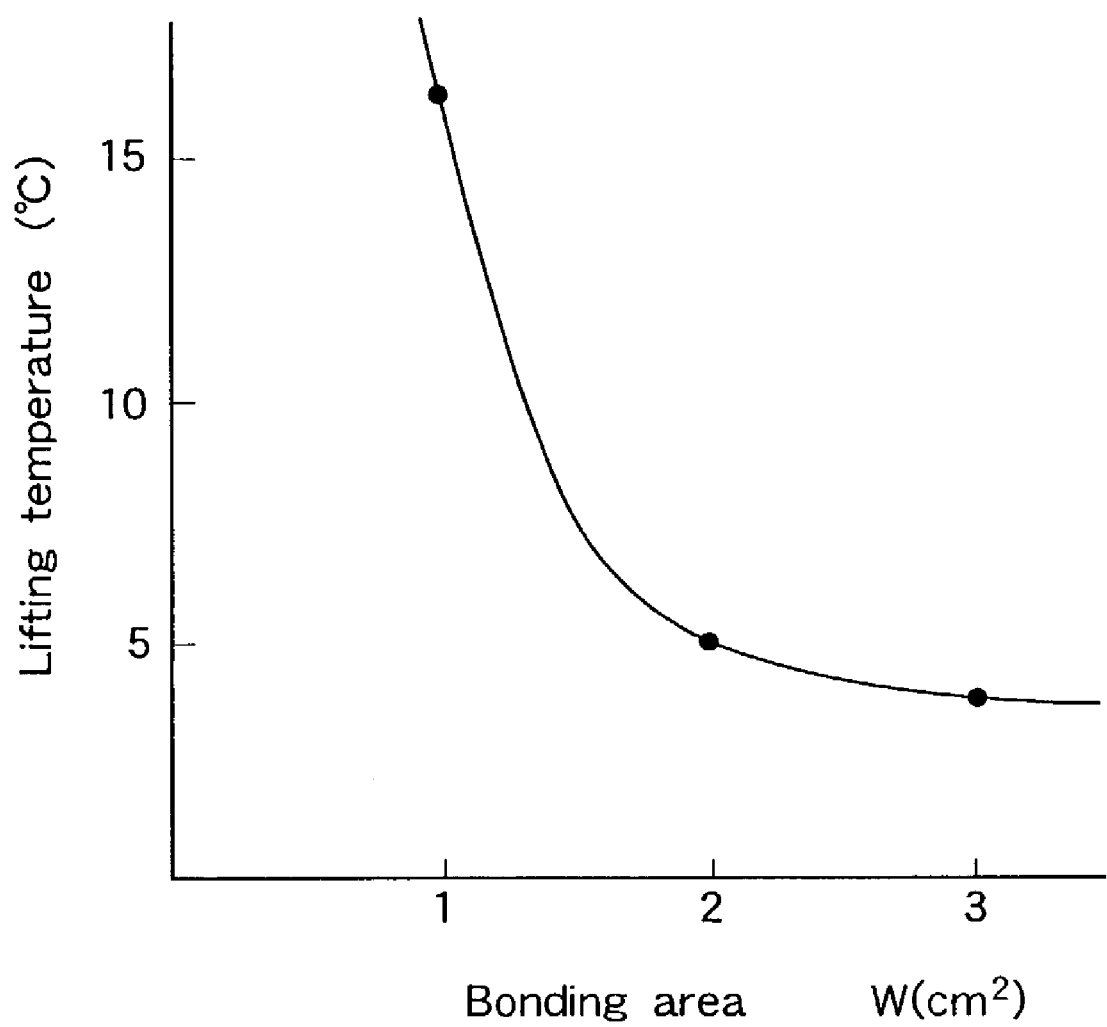
FIG. 18 is a graph of joint area W (cm)—temperature rise (C) which shows the result of Test Model 4.

As is clear from the result in this FIG. 18, we can see that the lifting of the surface temperature is kept at an extremely low level in case the relationship between the total joint area W (cm$^2$) of ultrasonic welding on the connection part of the bus-bar 12a (12b) and the average charge current I (A) from the secondary cell to which said bus-bar (12a or 12b) is connected satisfies W/I≧0.1 (Formula (2)) (in case the joint area W=2 cm$^2$ and 3 cm$^2$)

[Embodiment 3]

The lithium ion secondary cell module relating to Embodiment 1 of this invention is shown in FIGS. 19–23. The secondary cell module in this Embodiment 1 consists of the combination cell 1 which is composed of 4 sheet-type secondary cells 3 (3a,3b) formed in a sheet shape and connected in series with each other and the casing 2 of a thin-type rectangular shape containing the combination cell 2, the above-mentioned sheet-type secondary cell 3 is composed of the sheet-type internal electrode couple 4a, the electrolytic solution 4b not shown in the drawing and the flexible outer wrapper of envelope shape 4c of a plane rectangular shape containing air-tight these internal electrode couple 4a and the electrolytic solution as shown if FIG. 4, the above-mentioned internal electrode couple 4a are formed by laminating the sheet-type positive electrode 5a and the sheet-type negative electrode 5b with each other through the separator 5c, the above-mentioned flexible outer wrapper of envelope type 4c is formed by laminated film having its inner surface layer made of thermoplastic resin, its middle layer made of metal foil and its outer surface layer made of insulating resin, and the sheet-type positive electrode terminal 8a (negative electrode terminal 8b) one end of which is connected to the above-mentioned internal electrode couple 4a penetrates through the sealing part 7 of the above-mentioned outer wrapper of envelope type and each juts out in the direction opposite to each other.

Figure 21:
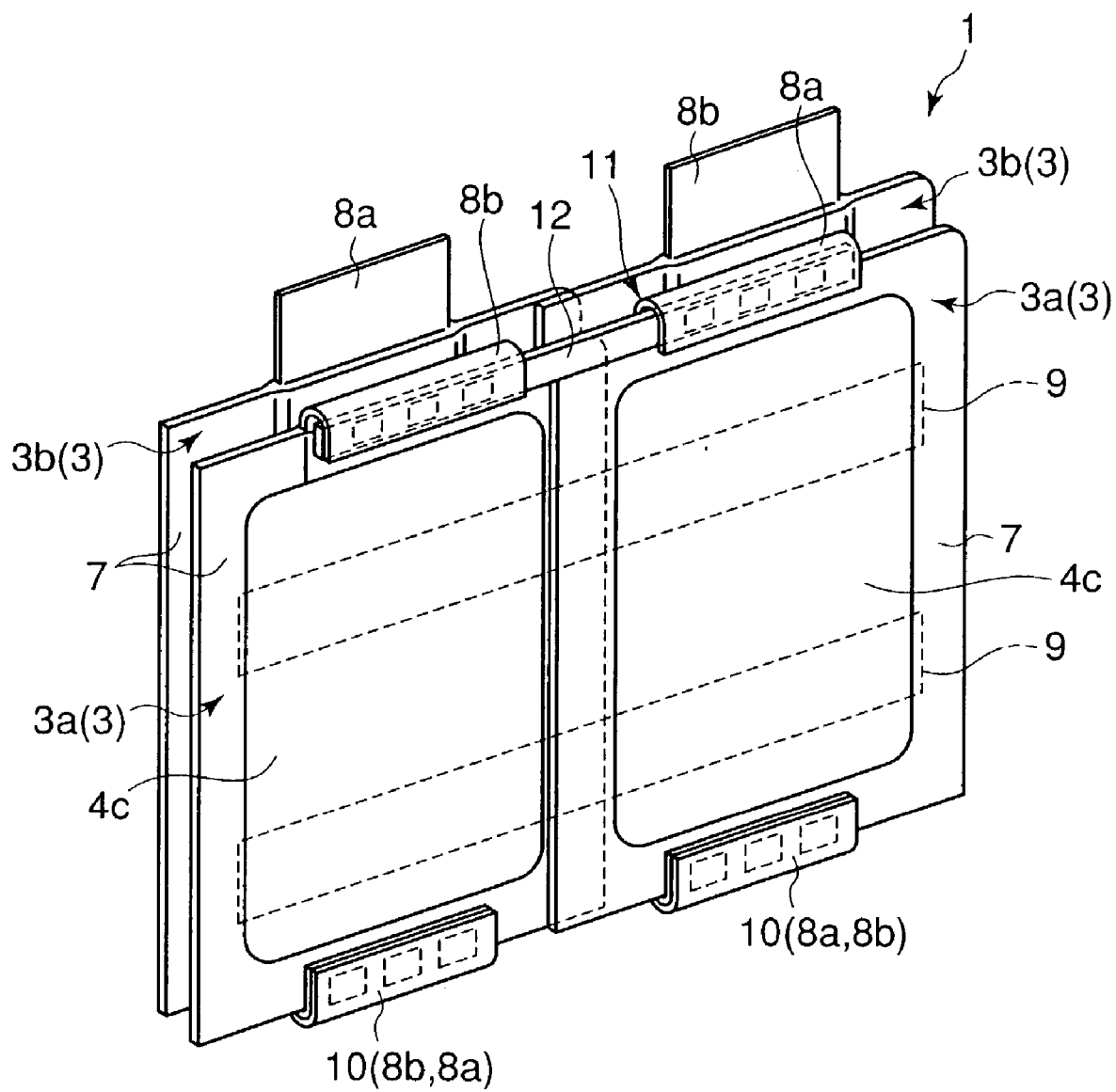
FIG. 21 is a perspective illustration of the combination cell formed by using sheet-type secondary cells in FIG. 4.
Figure 22:
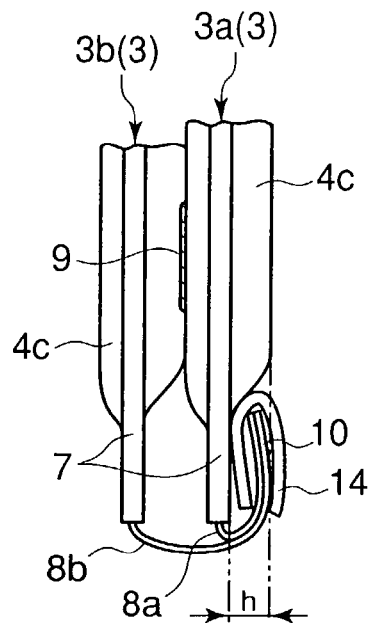
FIG. 22 is an illustration which shows the terminal connection part which is formed n the combination cell in FIG. 22.
Figure 23:
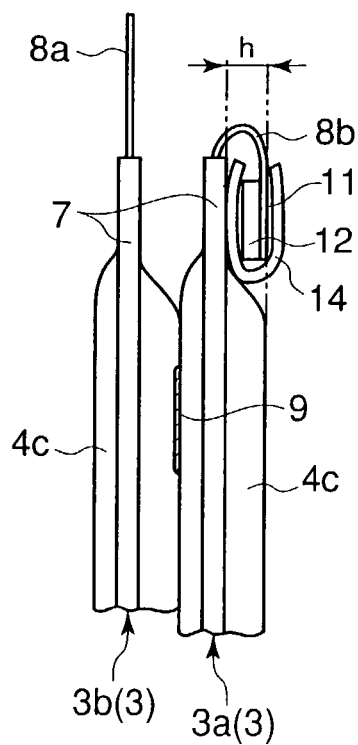
FIG. 23 is an illustration which shows the bus-bar connection part which is formed in the combination cell in FIG. 21.

In this Embodiment 3, the combination cell 1 is composed of 4 secondary cells 3 (3a, 3b) connected in parallel to each other. As shown in FIGS. 21–23, each of the two pairs of secondary cells (3a, 3b) which are vertically adjacent to each other forming a cell laminated couple are positioned in a manner in which the positive electrode terminal 8a of the secondary cell 3a (or 3b) and the negative electrode terminal 8b of the other secondary cell 3b (or 3a) face each other, and the two pairs of the secondary cells (3a, 3a) (3b, 3b) which are horizontally adjacent to each other forming a cell adjacent couple are positioned in a manner in which the positive electrode terminal 8a of the secondary cell 3a (or 3b) and the negative electrode terminal 3b (or 3a) of the other secondary cell are adjacent to each other.

In this combination cell 1, the 2 secondary cells 3a are positioned horizontally to each other with the sealing parts 7 of the outer wrapper of envelope type 4c overlapping each other (A surface side) and, similarly, the remaining 2 secondary cells 3b are positioned horizontally to each other with the sealing parts 7 of the outer wrapper of envelope type 4c overlapping with each other (B surface side). These 2 secondary cells 3b on A surface side and the 2 secondary cells 3a on B surface side are then positioned so that they overlap with each other, the relative positions of these 4 secondary cells 3 are being fixed by 2 double-faced adhesive tape of band type 9 inserted in between A surface side and B surface side.

As shown in FIG. 21, in a pair of secondary cells 3a, 3b which are positioned vertically adjacent to each other and form the cell laminated couple, the positive electrode terminal of the secondary cell 3a on A surface side and the negative electrode terminal 8b of the secondary cell 3b on B surface side (upper left side of FIG. 21), and the negative electrode terminal 8b of the secondary cell 3a on A surface side and the positive electrode terminal 8a of the secondary cell 3b on B surface side (upper right side of FIG. 21) are directly connected to each other by ultrasonic welding, thus forming the terminal connection part 10. Also, in the pair of secondary cell 3a which are positioned horizontally adjacent to each other and form cell adjacent couple, the negative electrode terminal 8b on the upper left side of the drawing and the positive electrode terminal on the upper right side of the drawing are connected to each other through the bus-bar 12, thus forming the bus-bar connection part. In this way, the 4 secondary cells 3 are connected in series with each other and form the combination cell 1.

In this Embodiment 3, the terminal connection part 10 of the above combination cell 1 is bent towards the A surface side, as shown in FIG. 22, and the bus-bar connection part 11 of the above combination cell 1 is bent with the bus-bar 12 being inside, as shown in FIG. 23. In this case, both the terminal connection part 10 and bus-bar connection part 11 are on the outer side surface of the outer wrapper of envelope type 4c of the secondary cell 3a of the A surface side and face its sealing part 7 and are positioned so that their outer surface height h becomes almost even with the outer surface of the secondary cell 3a. In addition, between these terminal connection part 10 and bus-bar connection 11 and the outer surface of the outer wrapper of envelope type, an insulating spacer 14 which is formed by a synthetic resin with electric insulation and which mount these terminal connection part 10 and bus-bar connection part 11 with its cross section being formed roughly to cover these from both surfaces is inserted In this Embodiment 3, a voltage detecting code not shown in the drawing is connected to the terminal connection part 10 and bus-bar connection part 11 of the combination cell 1, as well as these terminal connection part 10, bus-bar connection part and the voltage detector code being fixed by adhesive tape not shown in the drawing in order to maintain their posture of being bent and the state of circuits.

Figure 19:
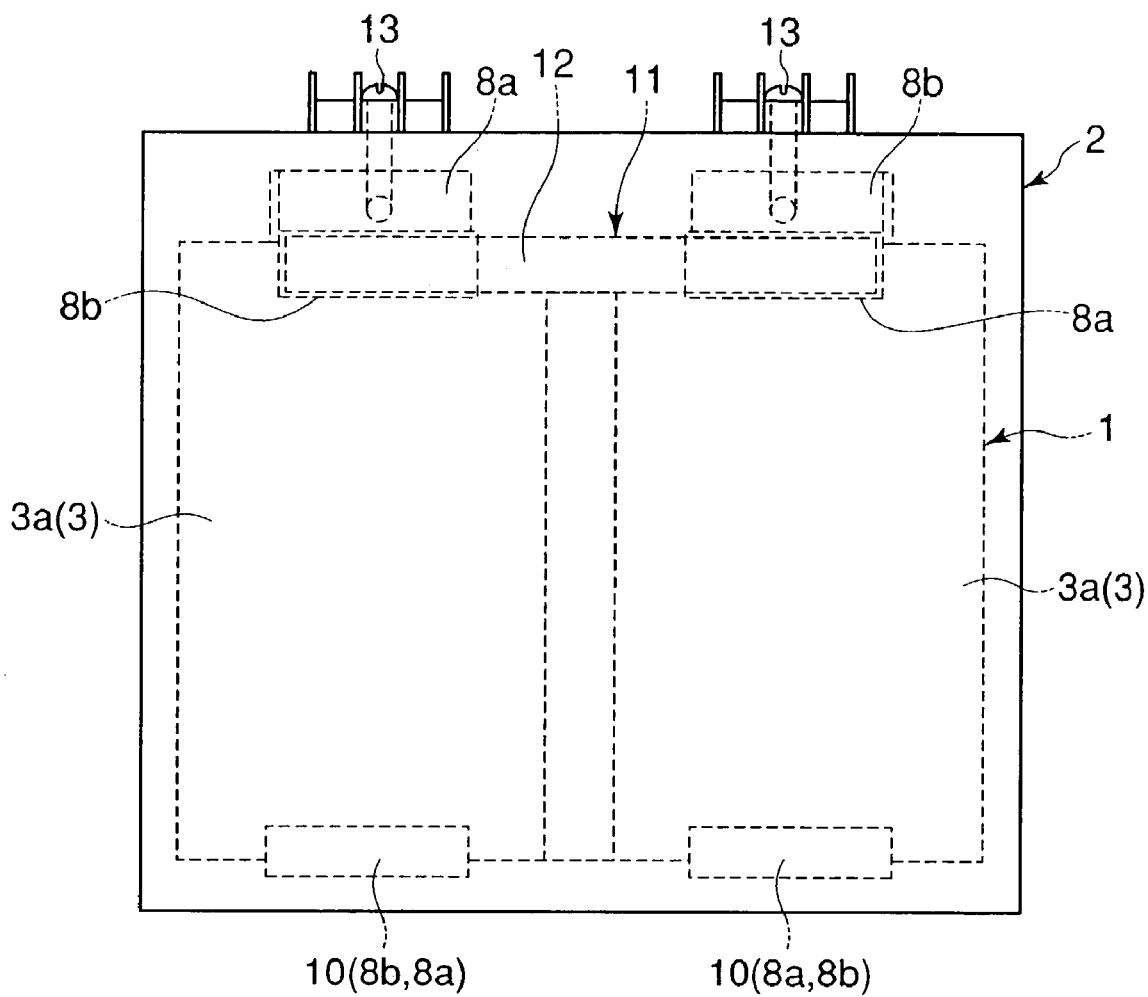
FIG. 19 is a front illustration which shows the secondary cell module relating to Embodiment 3 of this invention.
Figure 20:
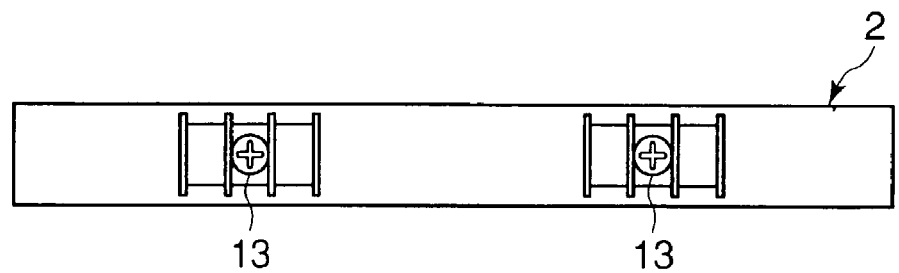
FIG. 20 is a plane illustration of FIG. 20.

As shown in FIG. 19 and FIG. 20, the combination cell 1 assembled as mentioned above is contained inside a casing 2 which is formed by stainless steel sheet, and the positive electrode terminal 8a and negative electrode terminal 8b which do not constitute the above terminal connection part 10 or bus-bar connection part serve as the positive electrode terminal and negative electrode terminal and are connected to outside leads installed on the outside of casing 1.

Furthermore, in the lithium ion secondary cell module in this Embodiment 3, a loading resin (not shown in the drawing) made of polyurethane resin, etc. of excellent thermal conductivity and electric insulation is filled in into the empty space between the combination cell 1 and the casing 2 which contains this combination cell 1, thereby fixing these combination cell 1 and the casing 2 so that they do not vibrate as well as the heat generating at time of discharging the combination cell being efficiently diffused to outside.

In this Embodiment 3, the combination cell 1 is formed firstly by horizontally positioning the 2 secondary cells 3b on B surface side with their sealing parts 9 overlapping each other, next by fixing these 2 secondary cells 3b by 2 double-faced adhesion tapes 9, and then by horizontally positioning and fixing, by these double-faced adhesion tapes 9, the 2 secondary cells 3b of A surface side on the 2 secondary cells 3b of B surface side with their heat sealing parts overlapping each other, and finally by forming terminal connection part 10 and bus-bar connection part 11.

[Variation Model 3]

FIGS. 24–26 and FIGS. 27–29 shows variation models on the treatment of the terminal connection part 10 and bus-bar connection part 11 in the above Embodiment 1.

Figure 24:
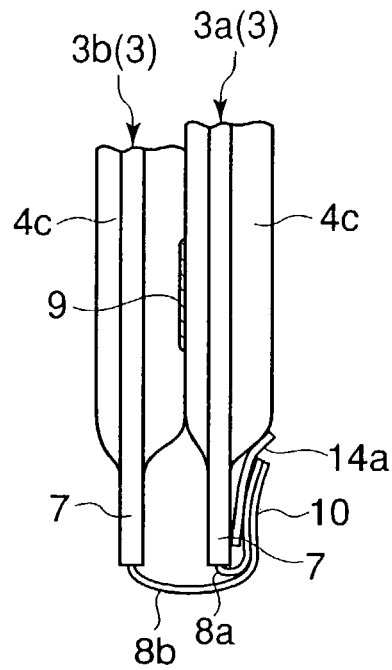
FIG. 24 is an illustration which shows a variation model of the terminal connection part which is formed in a combination cell.
Figure 25:
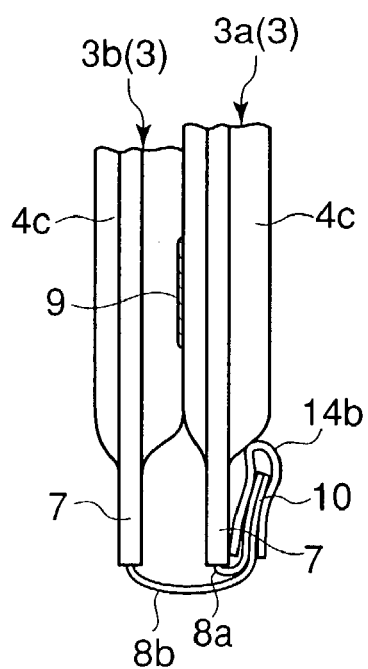
FIG. 25 is an illustration which shows another variation model of the terminal connection part which is formed in a combination cell.
Figure 26:
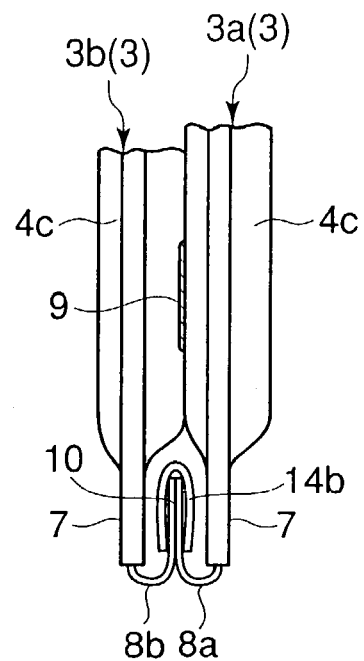
FIG. 26 is an illustration which shows a further variation model of the terminal connection part which is formed in a combination cell.

In FIG. 24, a pane sheet type insulation spacer 14a made of a synthetic resin of excellent electric insulation such as polypropylene, etc. is inserted between the terminal connection part 10 and the sealing part 7 of the outer wrapper of envelope type of the secondary cell 3 (3a,3b) to which this terminal connection part 10 faces. In FIG. 25, the terminal connection part 10 is covered from both surfaces by an insulation spacer 14b made of synthetic resin of excellent electric insulation such as polypropylene, etc., and with its cross section of roughly oblong shape. In FIG. 26, the terminal connection part 10 is positioned in between the outer surface of each sealing parts 7 between the secondary cell 3a of A surface side and the secondary cell 3b of B surface side which are vertically overlapping each other.

Figure 27:
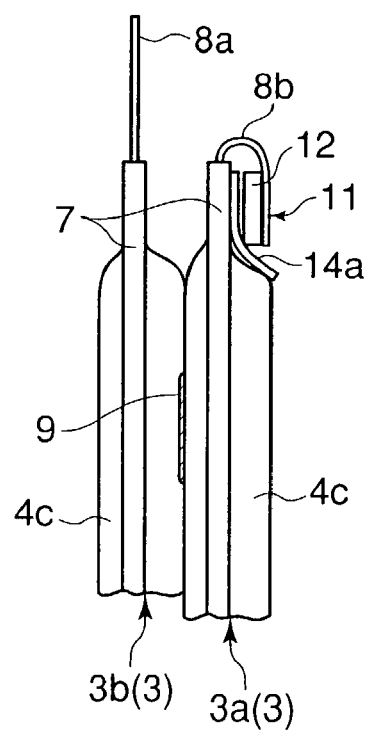
FIG. 27 is an illustration which shows a variation model of the bus-bar connection part which is formed in a combination cell.
Figure 28:
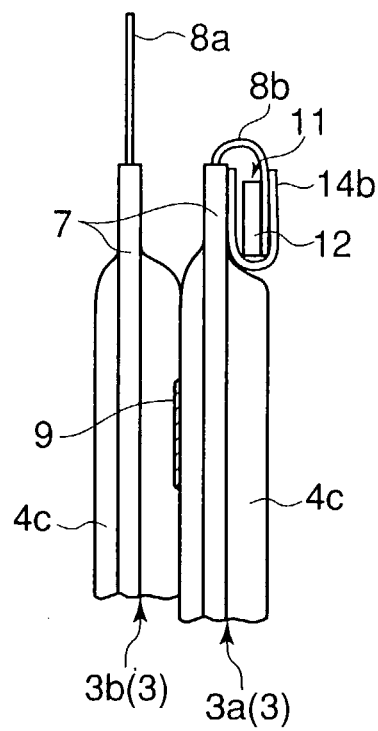
FIG. 28 is an illustration which shows another variation model of the bus-bar connection part which is formed in a combination cell.
Figure 29:
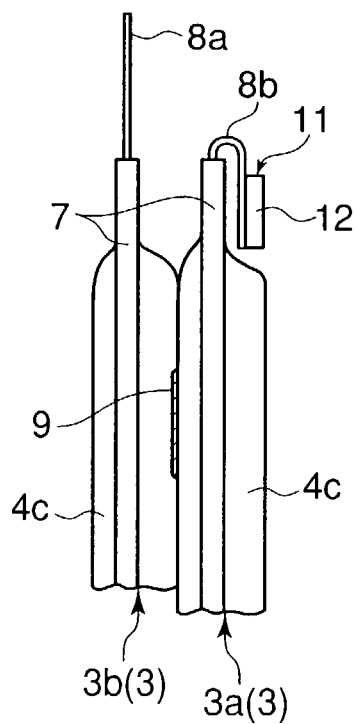
FIG. 29 is an illustration which shows a further variation model of the bus-bar connection part of a combination cell.

In FIG. 27, a pane sheet type insulation spacer 14a made of a synthetic resin of excellent electric insulation such as polypropylene, etc. is inserted between the bus-bar connection part 11 and the sealing part 7 of the outer wrapper of envelope type of the secondary cell 3 (3a, 3b) to which this bus-bar connection part 10 faces. In FIG. 28, the bus-bar connection part 11 is covered from both surfaces by an insulation spacer 14b made of synthetic resin of excellent electric insulation such as polypropylene, etc., and with its cross section of roughly oblong shape. In FIG. 29 the bus-bar connection part 11 is bent with its bus-bar 12 being on the outside.

[Embodiment 4]

Figure 30:
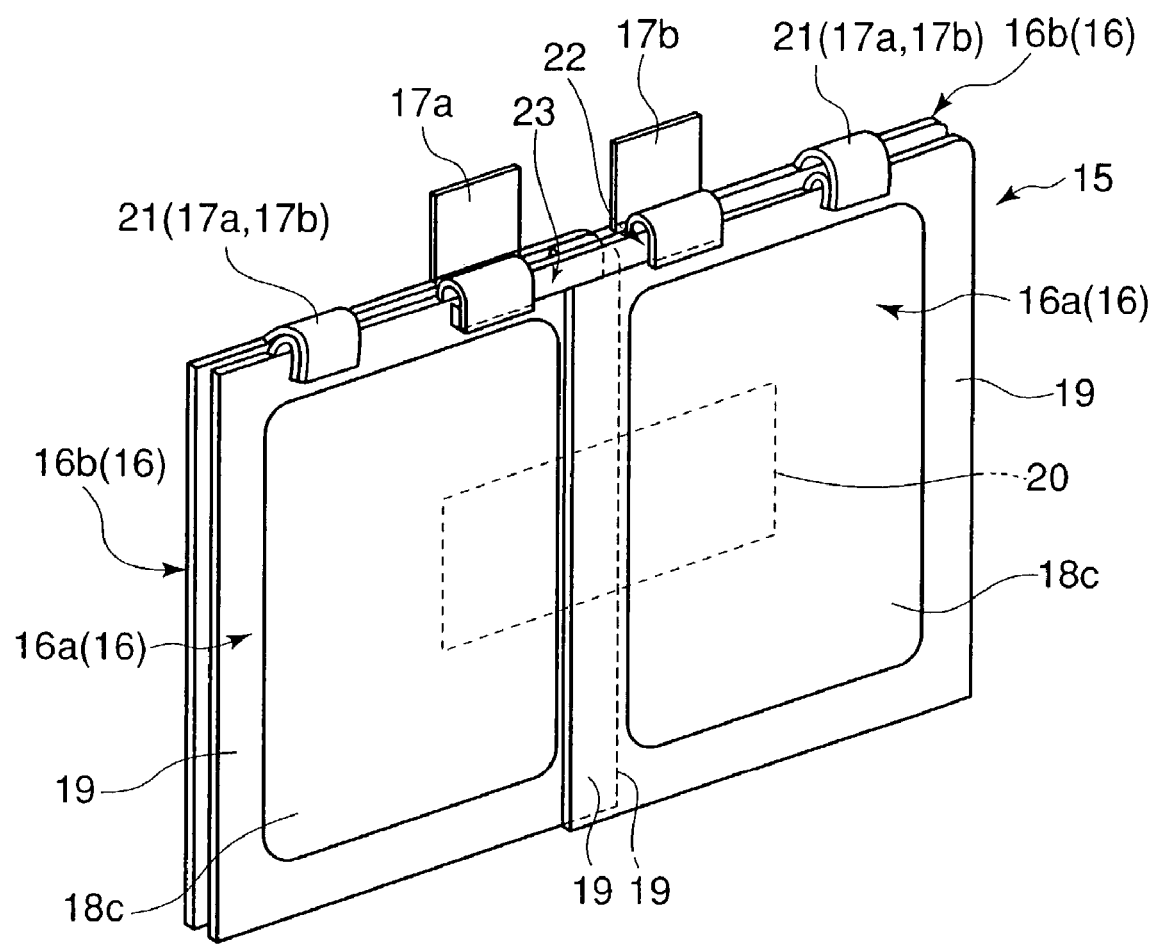
FIG. 30 is perspective illustration same as FIG. 22, which shows the combination cell of the secondary cell module of Embodiment 4 of this invention.

A combination cell 15 which was adopted in the lithium ion secondary cell module relating to Embodiment 4 is shown in FIG. 30. In this combination cell 15, different from the above-mentioned Embodiment 1, both of the sheet-type positive electrode terminal 17a and negative electrode terminal 17b of the sheet-type secondary cells 16 (16a,16b) penetrate the sealing part 19 of the outer wrapper of envelope type 18c and jut out to the outside in the same direction to each other. Also, the secondary cells 16 vertically and horizontally adjacent to each other are connected to each other by a double-faced adhesion tape 20 of wide band type. Furthermore, the positive electrode terminal 17a of the secondary cell 16a of A surface side and the negative electrode terminal 17b of the secondary cell 16b B surface side (left side of FIG. 30), and the negative electrode terminal 17b of the secondary cell 16a of A surface side and the positive electrode terminal 17a of the secondary cell 16b of B surface side (right side of FIG. 30) are respectively connected to each other by ultrasonic welding, thus forming the terminal connection part 21. Also, in the 2 secondary cells 16a which are adjacent to each other on A surface side, the negative electrode terminal 17b (upper left side of drawing) and the positive electrode terminal 17a (upper right side of drawing) which are adjacent to each other are connected to each other through a bus-bar 23 of band type, thus forming the bus-bar connection part 22.

In this Embodiment 4 like the above-mentioned Embodiment 3, both of the terminal connection part 21 and the bus-bar connection part 22 of the combination cell 15 are bent to A surface side, with both of these terminal connection part 21 and bus-bar connection part 22 positioned on the outer surface of the outer wrapper of envelope type 18c of the secondary cell 16a of A surface side and facing its sealing part 19 as well as the height of their outer surface being almost even with the outer surface of the secondary cell 16a.

Also in this Embodiment 4, the combination cell 15 is formed by positioning the 4 secondary cells 16 at prescribed sections, by fixing the secondary cells 16 vertically and horizontally adjacent to each other by using a double-faced adhesive tape 20 of wide band type, and then by forming the terminal connection part 21 and bus-bar connection part 22.

[Embodiment 5]

Figure 31:
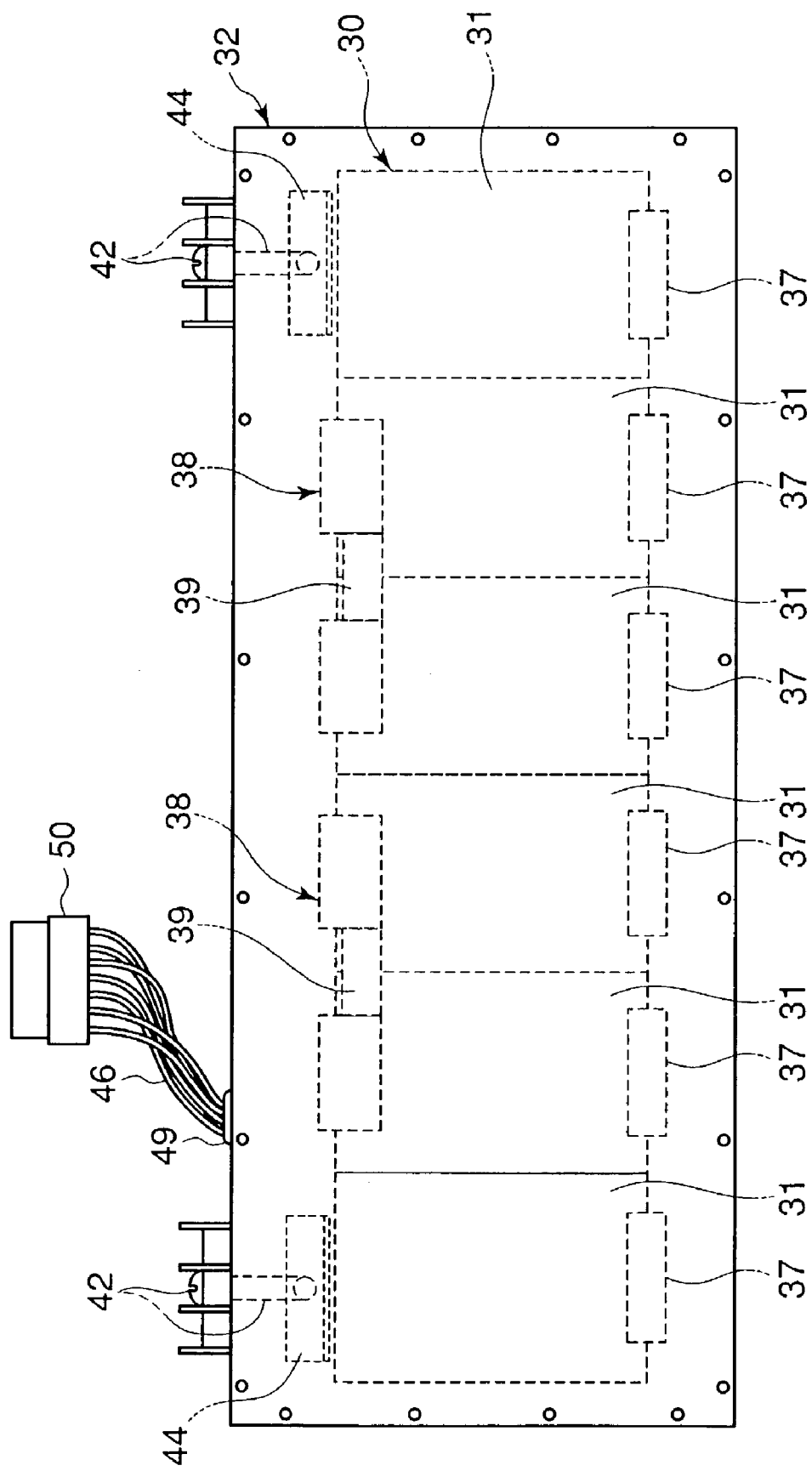
FIG. 31 is a front illustration which shows the secondary cell module relating to Embodiment 5 of this invention.
Figure 32:
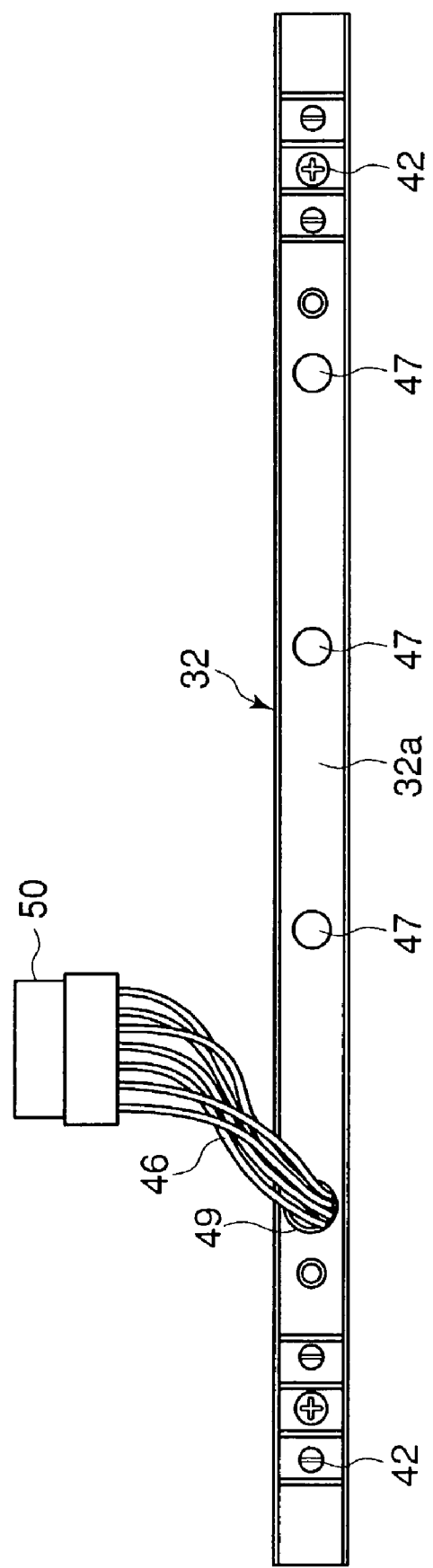
FIG. 32 is a plane illustration of FIG. 31.
Figure 33:
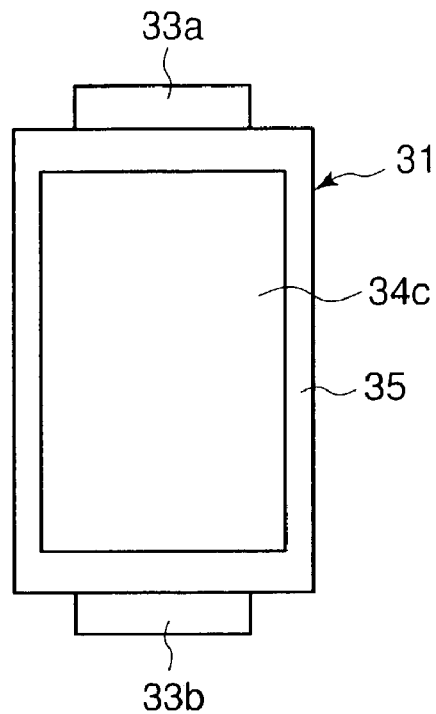
FIG. 33 is a front illustration of the sheet-type lithium ion secondary cell which is used in FIG. 31.

The lithium ion secondary cell module relating to this invention is shown in FIG. 31 and FIG. 32. Different from the above Embodiments 3 and 4, this secondary cell module is composed of combination cells 30 formed by a total of 24 sheet-type secondary cells 31 and the thin-shape rectangular casing 32 which contains this combination cell 30. Also, in the above secondary cell 31, as shown in FIG. 33, the positive electrode terminal 33a and the negative electrode terminal 33b are formed in sheet shape, penetrate the outer wrapper of envelope type of plane rectangular shape and juts out to outside in the directions opposite to each other.

Figure 34:
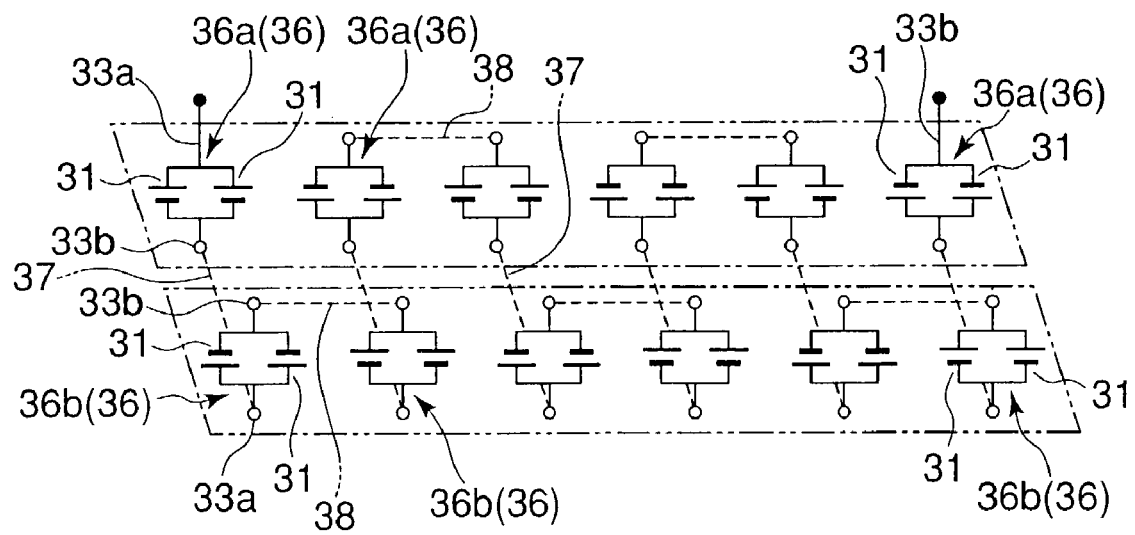
FIG. 34 is an illustration which shows the wiring diagram of the combination cell which is used in FIG. 31.

In the above combination cell, as shown in FIG. 34, 2 sheet-type secondary cells 31 are connected in parallel to each other to form 12 of cell units 36 (36a,36b), and 6 units each of these cell units 36 are positioned on A surface side (36a) and B surface side (36b) and connected in series with each other. In this combination cell 30, each pair of cell units (36a, 36b) which form a cell laminated layer couple by being laminated vertically with each other are positioned so that the positive electrode terminal 8a of one cell unit 36a (or 36b) faces the positive electrode terminal 8b of other cell unit 36b (or 36a). Also, each pair of cell units (36a, 36a) (36b, 36b)

which form a cell adjacent couple by being positioned horizontally to each other are positioned so that the positive electrode terminal 8*a* of one cell unit 36*a* (or 36*b*) is adjacent to the negative electrode terminal 8*b* of other cell unit 36*a* (36*b*).

The interval between the same electrode terminals forming the cell units 36*a* on A surface side connected in parallel to each other, the interval between the same electrode terminal forming the cell units 36*b* on B surface side connected in parallel to each other and the interval between the cell units 36*a* on A surface side and the cell units 36*b* on B surface side (total of 4 terminals) are simultaneously connected by ultrasonic welding, thus forming a total of 6 terminal connection parts 37. Also, the interval between the terminals of the cell units 36 (36*a*, 36*b*) which are positioned horizontally adjacent to each other on A surface side or B surface side are connected by ultrasonic welding through the bus-bar 39 (Refer to FIG. 36), thus forming a total of 5 bus-bar connection parts 38.

In this Embodiment 5 like the above-mentioned Embodiment 3, both of the terminal connection part 38 and the bus-bar connection part 38 are bent and positioned on the outer surface of the outer wrapper of envelope type 34*c* of the secondary cell 31, as well as being faced to the sealing part 35 of the outer wrapper of envelope type 34*c* and the height of their outer surface being almost even with the outer surface of the secondary cell 31.

The above combination cell 30 is formed as follows using the above-mentioned 24 sheet-type secondary cells.

Figure 35:
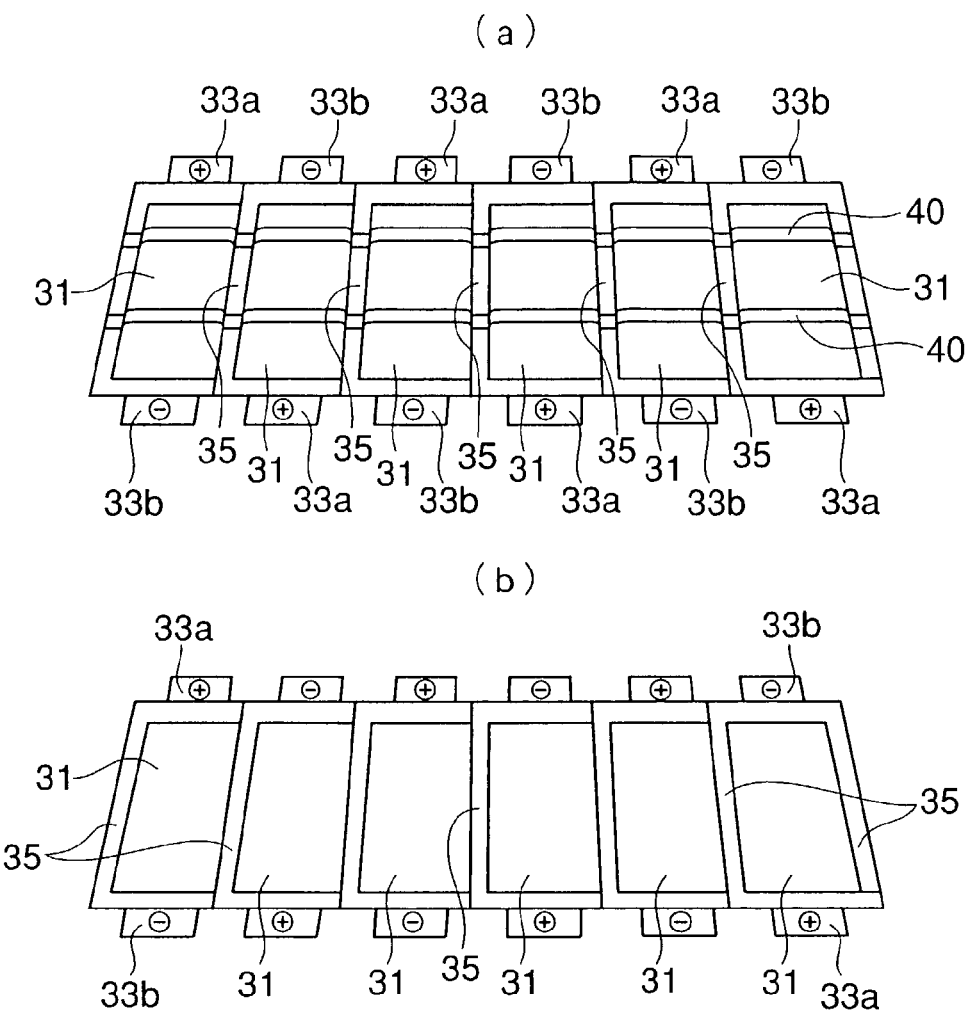
FIG. 35($a$) ($b$) is a plane illustration which shows the steps for assembling A surface side (series of cell units positioned on upper side in FIG. 34) of the combination cell which is shown in FIG. 34.

As shown in FIG. 35(*a*)(*b*), 6 sheet-type secondary cells 31 are positioned horizontally parallel with each other so that the sealing parts 35 on both right and left sides of the secondary cells 31 adjacent to each other vertically overlap each other and also, on the upper edge side, positive electrode terminal 33*a*, negative electrode terminal 33*b*, positive electrode terminal 33*a*, negative electrode terminal 33*b*, positive electrode terminal 33*a* and negative electrode terminal 33*b* are positioned sequentially in this order from left to right and, on the lower edge side, negative electrode terminal 33*b*, positive electrode terminal 33*a*, negative electrode terminal 33*b*, positive electrode terminal 33*a*, negative electrode terminal 33*b* and positive electrode terminal are positioned sequentially in this order from left to right, these 6 secondary cells 31 being fixed by means of 2 double-faced adhesion tape 40 of band type so that their relative positions do not go out of alignment (FIG. 35(*a*)). Further on top of this, 6 sheet-type secondary cells 31 are positioned horizontally parallel with each other, as is exactly the same as above, so that the sealing part 35 on both right and left sides of the secondary cell 31 adjacent to each other overlap each other, and at the same time, these are fixed by the above double-faced adhesion tape 40 (FIG. 35(*b*)), thus establishing the relative positions of 12 sheet-type secondary cells 31 comprising A surface side (series of cell units positioned upper side n the drawing in FIG. 34). Among the 12 secondary cells 31 comprising this A surface side, a pair of secondary cells 31 vertically overlapping each other comprise cell units 36*a* which are connected in parallel to each other.

By exactly the methods, the relative position of the 12 sheet-type secondary cells 31 which comprise B surface side (series of cell units positioned lower side in the drawing in FIG. 34) are established (not shown in the drawing). Among the 12 secondary cells 31 comprising this B surface side, a pair of secondary cells 31 vertically overlapping each other comprises cell units 36*b* which are connected in parallel to each other.

Next, with regard to the 12 sheet-type secondary cells 31 comprising A surface side, as shown in FIG. 35, a connection hole 43 to be connected to the lead 42 of the casing 32 is provided on each of the positive electrode terminal 33*a* or the negative electrode terminal 33*b*, positioned on upper edge, of the cell units 36*a* (a pair of secondary cell 31 vertically overlapping each other) which are positioned on both ends. The 4 cell units 36*a* positioned in between are connected in series at the same time as the bus-bar connection part 38 being formed by the bus-bar 39 in between the cell units 36 which form adjacent cell couple by being horizontally adjacent to each other. The above bus-bar connection part 38 is formed by simultaneously ultrasonic welding the interval between the positive electrode terminal 33*a* of the upper edge side of a pair of upper and lower sheet-type secondary cells 31 comprising one cell unit 36 and the bus-bar 39, and between the negative electrode terminal 33*b* of the upper edge side of a pair of upper and lower sheet-type secondary cells 31 comprising the other cell unit 36*a* and the bus-bar 39, respectively. At the same time, the interval between the positive electrodes terminals 33*a* or negative electrode terminals 33*b* of a pair of upper and lower secondary cells 31 comprising the cell unit 36*a* on the side to be connected to the bus-bar 39 are simultaneously welded, thus forming the positive electrode terminal 33*a* or negative electrode terminal 33*b* of the cell unit 36*a*, respectively.

Figure 37:
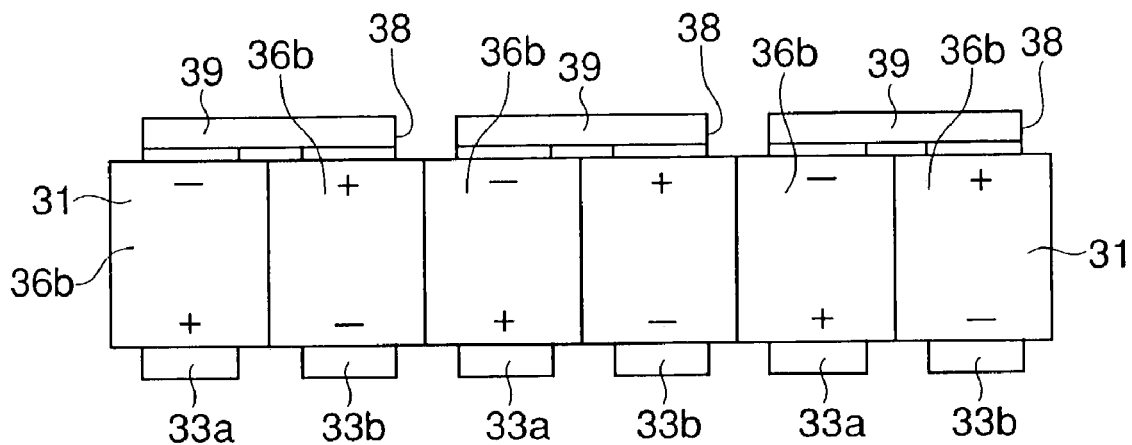
FIG. 37 is a plane illustration which shows, as a pattern diagram, completed B surface side of the combination cell shown in FIG. 34.

On the other hand, with regard to the 12 sheet-type secondary cells 31 forming A surface side, each cell unit 36*b* (a pair of secondary cells 31 vertically overlapping each other) forming cell adjacent units with the cell units being horizontally adjacent to each other at the right, middle and left sides, are connected in series by the bus-bar 39, thus forming the bus bar connection part 38, just as in the case of the above-mentioned A surface side, as shown in FIG. 37. As in the case of the above-mentioned A surface side, the above bus-bar connection part 38 is formed by simultaneously ultrasonic welding the interval between the positive electrode terminal 33*a* of the upper edge side of a pair of upper and lower sheet-type secondary cells 31 comprising one cell unit 36 and the bus-bar 39, and between the negative electrode terminal 33*b* of the upper edge side of a pair of upper and lower sheet-type secondary cells 31 comprising the other cell unit 36*b* and the bus-bar 39, respectively. At the same time, the interval between the positive electrodes terminals 33*a* or negative electrode terminals 33*b* of a pair of upper and lower secondary cells 31 comprising the cell unit 36*b* on the side to be connected to the bus-bar 39 are simultaneously welded, thus forming the positive electrode terminal 33*a* or negative electrode terminal 33*b* of the cell unit 36*b*, respectively.

Figure 36:
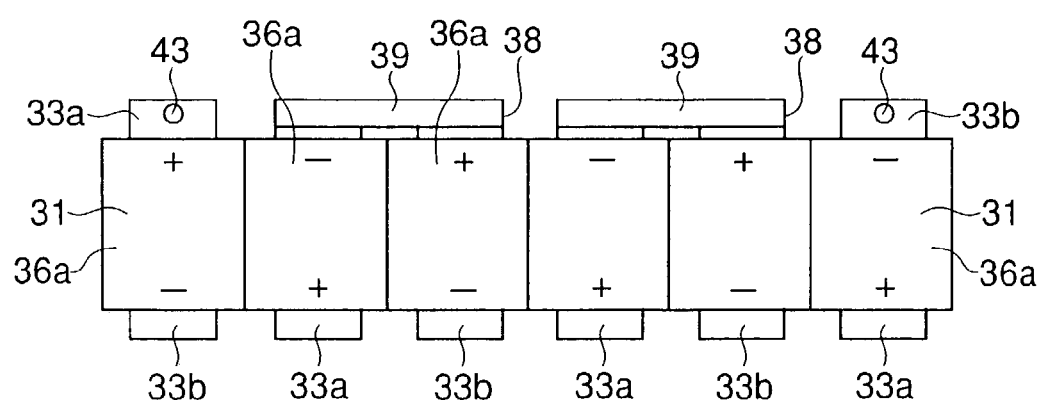
FIG. 36 is a plane illustration which shows, as a pattern diagram, completed A surface side of the combination cell shown in FIG. 34.
Figure 38:
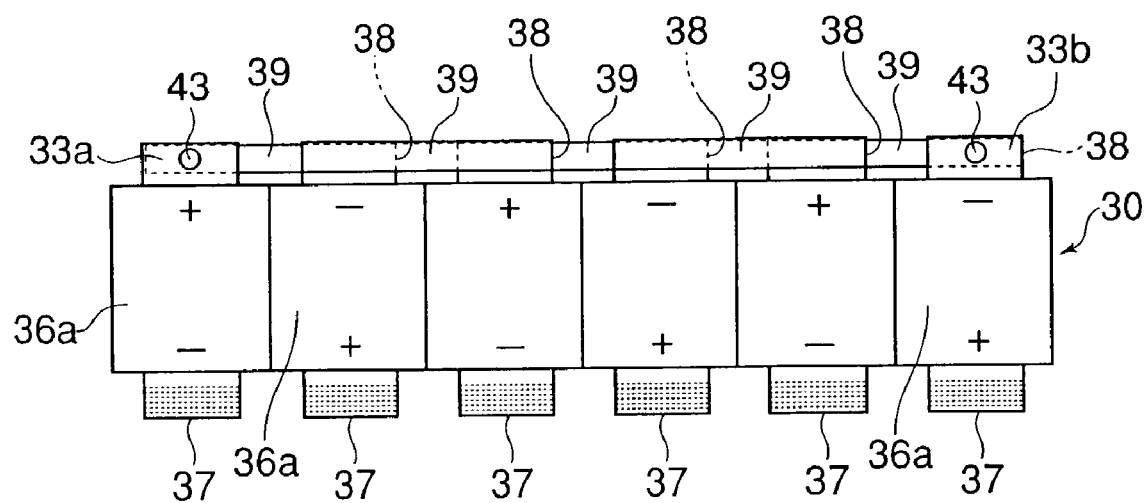
FIG. 38 is a plane illustration which shows, as a pattern diagram, the state of superimposition of A surface side in FIG. 36 and B surface side in FIG. 37.

After thus forming the bus-bar connection part 38 which connects the 6 cell units 36*a*, 36*b* in series with each other on A surface side and B surface side, respectively, the 12 sheet-type secondary cells 31 on A surface side shown in FIG. 36 are overlapped on the 12 sheet-type secondary cells 31 on B surface side shown in FIG. 37, as shown in FIG. 38. At the same time, the cell units 36*a*, 36*b* forming a vertical pair are positioned so that the positive electrode terminal 3*a* of one cell unit 36*a* and the negative electrode terminal 33*b* of the other cell unit 36*b* vertically overlap each other, thus forming a cell laminated layer couple where a pair of cell units 36*a*, 36*b* are vertically adjacent to each other. When overlapping this A surface side and B surface side, their relative positions are fixed by double-faced adhesive tapes not shown in the drawing, as mentioned above.

After positioning these 24 sheet-type secondary cells 31 in a prescribed relationship, the interval between each positive electrode terminal 33*a* and each negative electrode terminal 33b of cell units 36a and 36b forming a cell laminated layer couple are directly connected to each other, thus forming the terminal connection part 37 as well as performing the series connection. By this, all the cell units 36a and 36b are connected in series with each other and the connections of the combination cell 30 are completed. This terminal connection part 37 is also formed by welding the interval of the positive electrode terminal 33a of one cell unit 36a and the negative electrode terminal 33b of the other cell unit 36b by ultrasonic welding, where the 2 positive electrode terminal 33a and the 2 negative electrode terminal 33b in the 4 secondary terminals 31 are welded at the same time.

Figure 39:
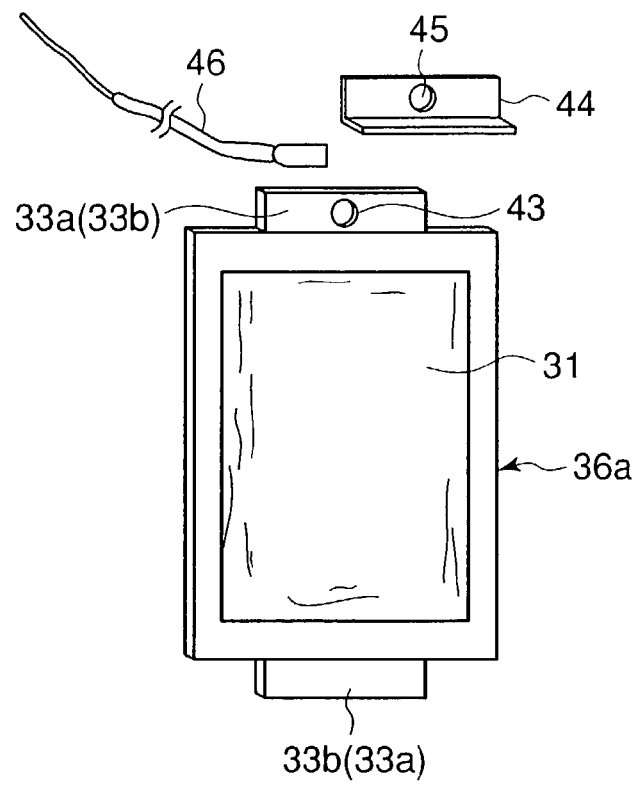
FIG. 39 is a perspective illustration of assembly and disassembly which shows the status of installation of a reinforcement and heat radiation bar to the positive electrode terminal (or negative electrode terminal) which is connected to the outer lead of the casing in a combination cell.

In addition, regarding the cell units 36a at both ends for which connection holes are provided for the purpose of connection to the outside lead 42 in the 12 sheet-type secondary cell comprising A surface side shown in FIG. 36, reinforcing and heat radiation bars 44 having the same size and connection holes 45 at the same position as the terminals are welded by ultrasonic welding to the positive electrode terminal 33a and the positive electrode terminal 33b on the upper edge, for the purpose of reinforcement and heat radiation, as shown in FIG. 39. In this case, voltage detector codes for detecting the voltage of the cell unit 36a are welded at the same.

Figure 40:
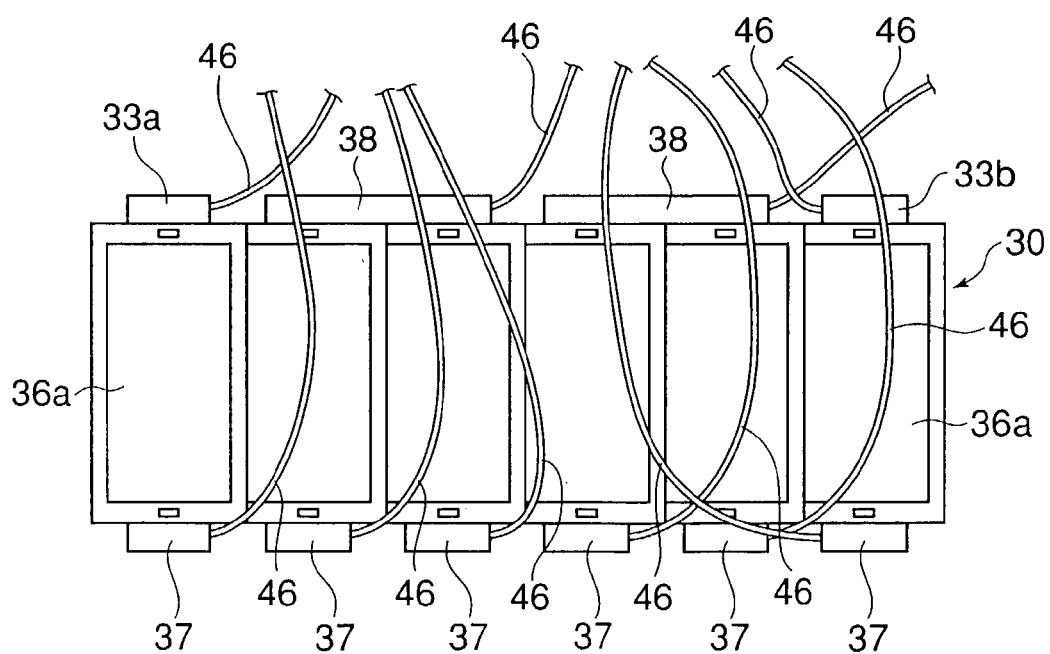
FIG. 40 is a plane illustration which shows the status under which a voltage detecting code is installed in the combination cell shown in FIG. 34.

Also, when forming the above-mentioned terminal connection part 37 and bus-bar connection part 38 by ultrasonic welding, the voltage detector codes 46 for detecting the voltage of each cell unit 36a, 36b, as shown in FIG. 40, just as in the case of FIG. 39.

Figure 41:
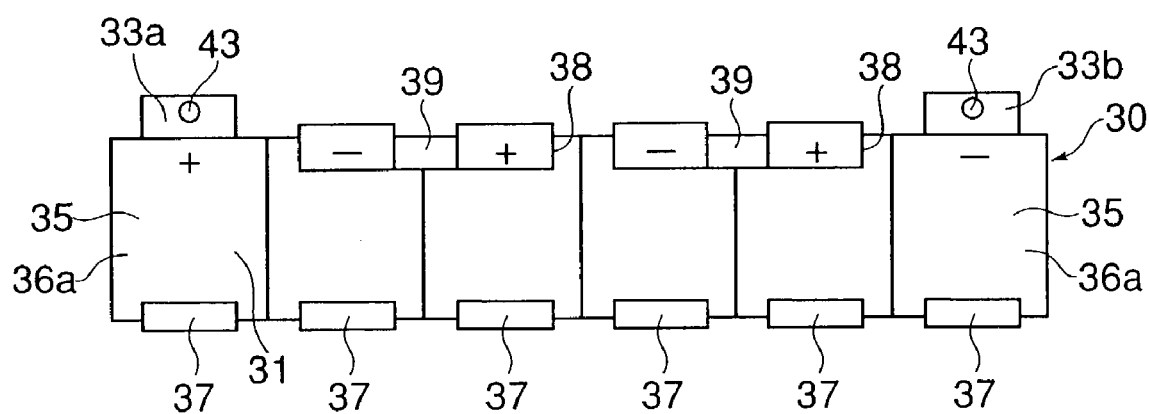
FIG. 41 is a plane illustration which shows, as a pattern diagram, the state of bended terminal connection part and bus-bar connection part in the combination cell shown in FIG. 34.

Furthermore, the terminal connection part 37 and bus-bar connection part 38 of the combination cell 30 assembled as mentioned above are bent and positioned on the outer surface of the outer wrapper of envelope type 35 of the sheet-type secondary cell 31 of the combination cell 30 as shown in FIG. 41, insulation spacers (not shown in the drawing) made of synthetic resin of electric insulation are inserted in between these terminal connection part 37 and bus-bar connection part 38 and the outer surface of the outer wrapper of envelope type 35, thereby enabling to make the combination cell 30 as compact as possible as well as ensuring further insulation at terminal connection part 37 and bus-bar connection part 38.

Figure 42:
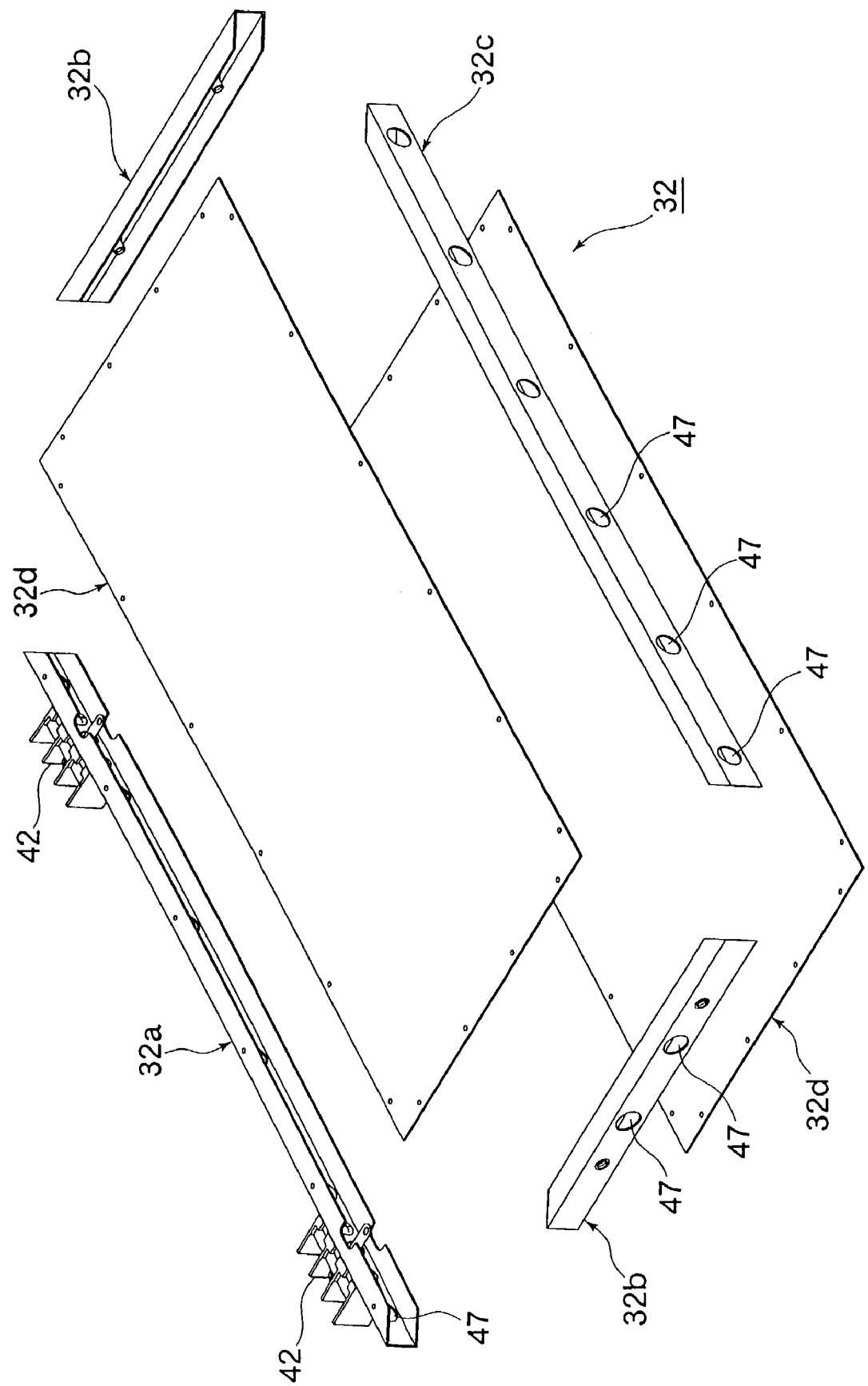
FIG. 42 is a diagram of assembly and disassembly of the casing in FIG. 31.

The combination cell 30 assembled as mentioned above is then contained inside the casing 32. As shown in FIG. 31, FIG. 32 and FIG. 42, the above casing 32 in this Embodiment 5 is composed of the terminal platform frame 32a having multi clairvoyant holes 47 and outer leads 42 connected to the positive electrode terminal 33 and negative electrode terminal 33b which are equipped with reinforcing and heat radiation bars 44 in the casing 30, a pair of side frames 32b and base frame 32c which straddle this terminal platform frame 32a and form the casing 32 as well as have multiple clairvoyant holes at prescribed intervals, and a pair of surface plates 32d which form the space to contain the above combination cell 30 by being fitted to the two sides of the frame formed by these terminal platform frame 32a, a pair of side frames 32b and base frame 32c.

Figure 43:
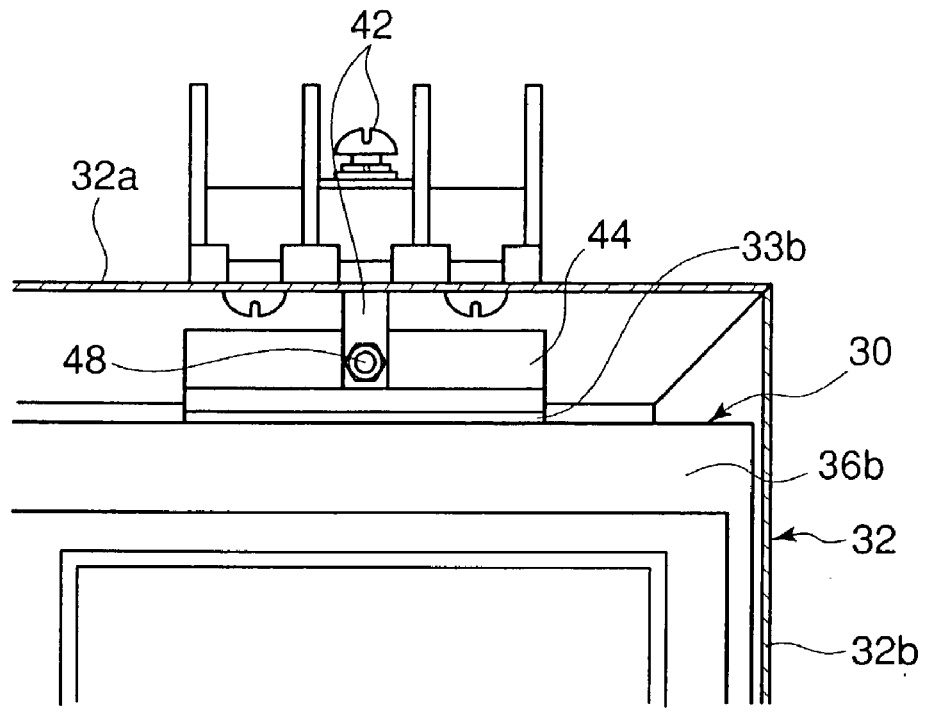
FIG. 43 is a partial cross sectional illustration which shows the state of connection between the outer lead of the casing and the positive electrode terminal (or negative electrode terminal) to which a reinforcement and heat radiation bar is installed in a combination cell.

When the above combination cell 30 is incorporated into the casing 32, firstly, the positive electrode terminal 33a and the negative electrode terminal 33b to which reinforcing and heat radiation bars 44 are fitted in the combination cell 30 and the outer leads 42 of terminal platform frame 32a are connected and fixed by bolts and nuts, and secondly, a pair of side frames 32b and base frame 32c are placed on the right and left sides and the base surface of the combination cell 30 in which this terminal platform frame 32a is installed, respectively, and lastly, the one of the surface plates 32d is placed on the top of the casing and fix these terminal platform frame 32a, a pair of side frames 32b, base frame 32c and surface frame by means of screws, adhesives, etc. which are not shown in the drawing, as shown in FIG. 43.

With regard to the voltage detector codes 46 connected to the above-mentioned terminal connection part 37 and bus-bar connection part 38, their position are considered and decided, preferably taken care of by means of adhesive tapes, etc., before they are fitted to the terminal platform frame 32a of the combination cell 30. The voltage detector codes 46 are bundled together and are drawn out from the code take-out port 49 provided on the terminal platform frame 32a. At the same time, the thermistor, thermo couple, etc. which are to be incorporated in the secondary cell module are fixed on their prescribed positions, in advance.

Next the combination cell 30 fitted with these terminal platform frame 32a, a pair of side frames 32b, base frame 32c and one of the surface plates 32d is turned around head and tail, and again, the other surface plate 3d is placed on the frame consisting of the terminal platform frame 32a, a pair of side frames 32b and base frame 32c, and fix these terminal platform frame 32a, a pair of side frames 32b and base frame 32c and surface plate 32d are fixed by means of adhesives, etc. not shown in the drawing.

In this Embodiment 5, after the combination cell 30 is incorporated into the casing 32 as mentioned above, the clairvoyant holes 47 provided on the terminal platform frame 32a, a pair of side frames 32b and base frame 32c are sealed by temporarily fixing masking tapes, etc. except for several, at least more than 2, holes. Urethane resin not shown in the drawing with an excellent thermal conductivity is used as a loading resin and is filled in from the clairvoyant holes 47 which are left open, after the urethane resin is hardened, the masking tape, etc. is removed and the voltage detector codes 46 drawn out form the casing 32 are cut in order, thus forming the harness 50 to complete the secondary cell module.

Since urethane resin is used as a loading resin and is filled in inside the casing 32 in this secondary cell module in this Embodiment 5, the space between the casing 32 and the combination cell 30 is filled by urethane resin and the combination cell 30 is firmly fixed inside the casing 32 as well as an excellent thermal conductivity is shown due to the performance of this urethane resin. Also the clairvoyant holes 47 respectively provided on the terminal platform frame 32a, a pair of side frames 32b and base frame 32c serve to emit into outside, those gases, etc. which generate inside the air-tight casing 32, in cases where the casing is exposed to an excessively high heat from outside such as at time of automobile accidents, fires, etc.

[Variation Model 4]

Figure 44:
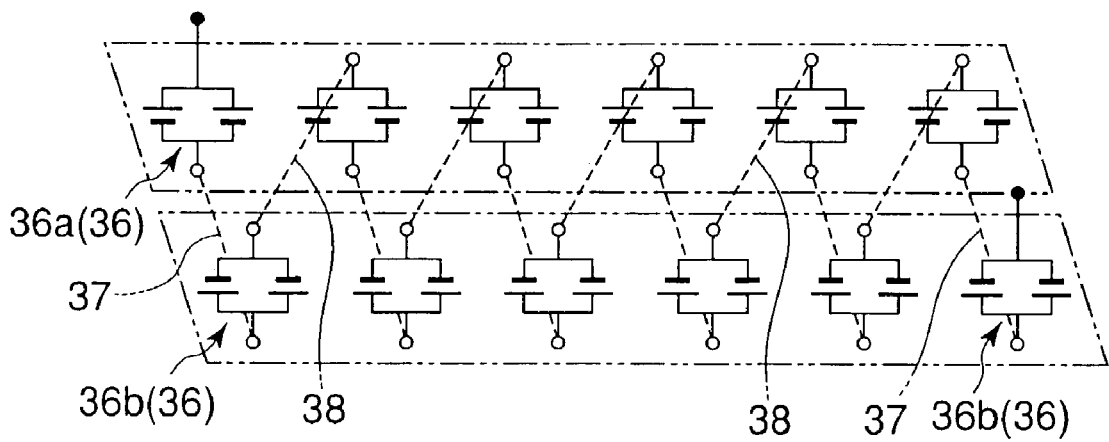
FIG. 44 is an illustration same as FIG. 34, which shows the composition of the combination cell relating to the variation model of this embodiment.

FIG. 44 shows a variation model of the combination cell 30 in the above embodiment 5. Different from the case in FIG. 34, the bus-bar connection part 38 is formed so that it straddles the section between the cell unit 36a (a series of cell units positioned on the upper side of the drawing) of B surface side and the cell unit 36b (a series of cell units positioned on the lower side of the drawing) of B surface side.

Just as in the case of the above-mentioned embodiment, a secondary cell module can be formed in this variation model, too.

What is claimed is:

1. A secondary cell module, comprising:
   more than one sheet-shaped secondary cell, each sheet-shaped secondary cell comprising a sheet-shaped internal electrode couple, electrolytic solution, a flexible outer wrapper containing air-tightly the internal electrode couple and electrolytic solution therein, a positive electrode terminal and negative electrode terminal; and a metal bus-bar which connects the positive electrode terminal and/or negative electrode terminal of at least one pair of sheet-shaped secondary cells in series and/or in parallel with each other so as to form a combination cell, within each of the flexible outer wrapper of each said at least one pair of sheet-shaped secondary cells is in the shape of an envelope and is formed of a laminated film having three layer structure comprising an inner layer made of thermoplastic resin with an electrolytic solution resistance and a heat sealing capacity, a middle layer made of metal foil with a flexibility and strength and an outer layer made of an insulating resin with an electric insulation property, the positive electrode terminal and the negative electrode terminal forming the combination cell and each bus-bar which connects the positive electrode terminal and/or negative electrode terminal are both formed in the form of sheet, the flexible outer wrappers of the at least one pair of sheet-shaped secondary cells have sealing parts only around the periphery thereof between said adjacent inner layers made of thermoplastic resin, and the sealing parts of the flexible outer wrappers of said at least one pair of secondary cells overlap each other in the vertical direction and said sheet-shaped secondary cells are adjacently positioned in the horizontal direction with respect to each other.

2. The secondary cell module according to claim 1, wherein
the cross-sectional area of each bus-bar is more than 0.5 times of the total of the cross-sectional area of the positive electrode terminal and/or negative electrode terminal which are connected to the bus-bar.

3. The secondary cell module according to claim 1, wherein
each bus-bar is made of a material having thermal conductivity higher than that of a material for the positive electrode terminal and/or negative electrode terminal which are connected to the bus-bar.

4. A secondary cell module according to claim 1, in which the total of joint area of joint sections which are formed on each connection part by ultrasonic welding and/or rivets and an average discharge current from the sheet-shaped secondary cell connected to the bus-bar has a relationship of the following formula (1):

$$W/I \geqq 0.1 \tag{1}$$

wherein, W represents the total of joint area of joint sections (cm$^2$), I represents the average discharge current (A).

5. The secondary cell module according to claim 1 or 4, wherein each the connection part is connected at multiple joint sections.

6. The secondary cell module according to claim 1, wherein
the at least one pair of secondary sheet-shaped cells are laminated by overlapping each other, and
the terminal connection part is positioned on the outer surface of one the sheet-shaped secondary cells which are laminated.

7. The secondary cell module according to claim 1, wherein
the at least one pair of sheet-shaped secondary cells are laminated by overlapping each other, and
the terminal connection part is positioned in between the outer surfaces of the flexible outer wrapper of the sheet-shaped secondary cells which are laminated.

8. The secondary cell module according to claim 1, further comprising an insulation spacer, wherein
the insulation spacer is made of synthetic resin of electric insulation, paper or rubber,
the insulation spacer is located either between a terminal connection part formed by directly connecting each terminal and the outer surface of the flexible outer wrapper or between a bus-bar connection part formed by connecting each terminal through the bus-bar and the outer surface of the flexible outer wrapper.

9. The secondary cell module according to claim 1, wherein
each sheet-shaped secondary cell forming a combination cell has the positive electrode terminal and the negative electrode terminal, each of which extends in a direction opposite to each other from the flexible outer wrapper,
the sheet-shaped secondary cells are connected by being laminated vertically to each other so as to form a cell laminated couple,
the cell laminated couple are connected horizontally adjacent to each other so as to form a cell adjacent couple, and
a pair of the sheet-shaped secondary cells forming the cell laminated couple are positioned so that the negative electrode terminal of one sheet-shaped secondary cell faces the positive electrode terminal of the other sheet-shaped secondary cell.

10. The secondary cell module according to claim 9, wherein
a pair of sheet-shaped secondary cells forming the cell laminated couple form a terminal connection part by the positive electrode terminal of one sheet-shaped secondary cell being directly connected to the negative electrode terminal of the other sheet-shaped secondary cell, and
a pair of the sheet-shaped secondary cells forming the cell adjacent couple form a bus-bar connection part by the positive electrode terminal or one sheet-shaped secondary cell being connected to the negative electrode terminal of the other sheet-shaped secondary cell through a bus-bar.

11. The secondary cell module according to claim 1, wherein sheet-shaped secondary cells which are vertically and/or horizontally adjacent to each other are fixed by means of adhesion.

12. The secondary cell module according to claim 11, wherein
the means of adhesion is a double-faced adhesive tape.

13. The secondary cell module according to claim 1, further comprising, a casing and a loading resin of electric insulation, wherein
the combination cell is contained in the casing,
the loading resin of electric insulation is filled inside the casing so as to fix the combination cell.

14. The secondary cell module according to claim 1, wherein a connection part between each bus-bar and each of the of the positive electrode terminal and/or negative electrode terminal is welded by ultrasonic welding.

15. The secondary cell module according to claim 1, wherein
a pair of secondary cells are connected to each other so as to form the combination cell,
a terminal connection part formed by directly connecting each terminal and/or the bus-bar connection part formed by connecting each terminal through the bus-bar are bent, the terminal connection part being positioned on the outer surface of the flexible outer wrapper of the sheet-shaped secondary cell.

16. The secondary cell module according to claim 8, wherein the insulation spacer is positioned to separate the terminal connection part and/or the bus-bar connection part from the surface of the flexible outer wrapper and to cover both sides of the terminal connection part and/or the bus-bar connection part.

17. A secondary cell module, comprising:
more than one sheet-shaped secondary cell, each sheet-shaped secondary cell comprising a sheet-shaped internal electrode couple, electrolytic solution, a flexible outer wrapper containing air-tightly the internal electrode couple and electrolytic solution therein, a positive electrode terminal and negative electrode terminal;
a metal bus-bar which connects the positive electrode terminal and/or negative electrode terminal of at least one pair of sheet-shaped secondary cells in series and/or in parallel with each other so as to form a combination cell;
an insulation spacer, and
a terminal connection part formed by directly connecting each terminal and/or the bus-bar connection part formed by connecting each terminal through the bus-bar are bent, the terminal connection part being positioned on the outer surface of the flexible outer wrapper of the sheet-shaped secondary cell, wherein
each of the flexible outer wrapper of each said at least one pair of sheet-shaped secondary cells is in the shape of an envelope and is formed of a laminated film having a three layer structure comprising an inner layer made of a thermoplastic resin with an electrolytic solution resistance and a heat sealing capacity, a middle layer made of a metal foil with a flexibility and strength and an outer layer made of an insulating resin with an electric insulation property,
the positive electrode terminal and the negative electrode terminal forming the combination cell and each bus-bar which connects the positive electrode terminal and/or negative electrode terminal are both formed in the form of a sheet,
the flexible outer wrappers of the at least one pair of sheet-shaped secondary cells have sealing parts only around the periphery thereof between said adjacent inner layers made of thermoplastic resin,
the sealing parts of the flexible outer wrappers of said at least one pair of secondary cells overlap each other in the vertical direction and said sheet-shaped secondary cells are adjacently positioned in the horizontal direction with respect to each other, and
the insulation spacer is positioned to separate the terminal connection part and/or the bus-bar connection part from the surface of the flexible outer wrapper and to cover both sides of the terminal connection part and/or the bus-bar connection part.

* * * * *